US011880695B2

(12) United States Patent
Lin et al.

(10) Patent No.: US 11,880,695 B2
(45) Date of Patent: Jan. 23, 2024

(54) PLUG-IN IMPLEMENTATION METHOD AND PLUG-IN IMPLEMENTATION SYSTEM

(71) Applicant: HUAWEI TECHNOLOGIES CO., LTD., Guangdong (CN)

(72) Inventors: Zhenchao Lin, Shanghai (CN); Chao Ding, Shanghai (CN); Linlin Tu, Wuhan (CN); Jinfei Wang, Wuhan (CN); Xiaoxuan Chen, Shanghai (CN); Weisai Ning, Shanghai (CN); Zhongling Chen, Shenzhen (CN); Lei Liu, Shanghai (CN); Qinhua Jiang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 61 days.

(21) Appl. No.: 17/697,498

(22) Filed: Mar. 17, 2022

(65) Prior Publication Data
US 2022/0222090 A1 Jul. 14, 2022

Related U.S. Application Data

(63) Continuation of application No. PCT/CN2020/107681, filed on Aug. 7, 2020.

(30) Foreign Application Priority Data

Sep. 18, 2019 (CN) .......................... 201910883745.X

(51) Int. Cl.
*G06F 9/445* (2018.01)
*G06F 8/71* (2018.01)
(52) U.S. Cl.
CPC ............ *G06F 9/44526* (2013.01); *G06F 8/71* (2013.01); *G06F 9/44536* (2013.01)

(58) Field of Classification Search
CPC ..... G06F 9/44526; G06F 9/44536; G06F 8/71
See application file for complete search history.

(56) References Cited

U.S. PATENT DOCUMENTS

| 7,240,323 B1 | 7/2007 | Desai et al. |
| 2005/0132352 A1 | 6/2005 | Shen |

(Continued)

FOREIGN PATENT DOCUMENTS

| CN | 101937353 A | 1/2011 |
| CN | 103309674 A | 9/2013 |

(Continued)

OTHER PUBLICATIONS

Dreihahn, H., et al., Simplifying Maintenance with Plug-In Interfaces—A Case Study, SpaceOps 2006 Conference, 2006, 10 pages, [retrieved on Sep. 12, 2023], Retrieved from the Internet: <URL:http://arc.aiaa.org>.*

(Continued)

*Primary Examiner* — Geoffrey R St Leger
(74) *Attorney, Agent, or Firm* — WOMBLE BOND DICKINSON (US) LLP

(57) ABSTRACT

This application provides a plug-in implementation system and method. The system includes a plug-in module and a terminal software module. When the terminal software module does not include a service implementation of a first plug-in interface, the plug-in module may load a default implementation of the first plug-in interface to invoke the first plug-in interface. In this way, a plug-in may be extended to extend a service function of a terminal. In addition, when the plug-in interface is inconsistent with a plug-in function, the default implementation of the plug-in interface is implemented by using the plug-in module, so that an open-source software module can run normally, to ensure normal running of an electronic device as much as possible. Therefore, the open-source software module no longer depends on the (Continued)

terminal software module, and the terminal software module can be decoupled from the open-source software module.

20 Claims, 12 Drawing Sheets

(56) References Cited

U.S. PATENT DOCUMENTS

| | | | |
|---|---|---|---|
| 2006/0031855 A1* | 2/2006 | Smithline | G06F 9/541 719/328 |
| 2006/0041665 A1* | 2/2006 | Karnik | H04L 67/51 709/228 |
| 2010/0138547 A1 | 6/2010 | Knapp | |
| 2010/0166004 A1 | 7/2010 | Wang et al. | |
| 2011/0185340 A1 | 7/2011 | Trent et al. | |
| 2013/0198733 A1 | 8/2013 | Farrell et al. | |
| 2017/0168807 A1 | 6/2017 | Li | |

FOREIGN PATENT DOCUMENTS

| | | |
|---|---|---|
| CN | 103365644 A | 10/2013 |
| CN | 103425517 A | 12/2013 |
| CN | 104601651 A | 5/2015 |
| CN | 105373396 A | 3/2016 |
| CN | 105389222 A | 3/2016 |
| CN | 105912366 A | 8/2016 |
| CN | 105955787 A | 9/2016 |
| CN | 106126299 A | 11/2016 |
| CN | 106569794 A | 4/2017 |
| CN | 106874047 A | 6/2017 |
| CN | 106909408 A | 6/2017 |
| CN | 107203683 A | 9/2017 |
| CN | 107870787 A | 4/2018 |
| CN | 107908397 A | 4/2018 |
| CN | 107911401 A | 4/2018 |
| CN | 108563472 A | 9/2018 |
| CN | 108874554 A | 11/2018 |
| CN | 108959605 A | 12/2018 |
| CN | 108984224 A | 12/2018 |
| CN | 109582400 A | 4/2019 |
| CN | 109614158 A | 4/2019 |
| CN | 109840079 A | 6/2019 |
| CN | 109901817 A | 6/2019 |
| CN | 110162345 A | 8/2019 |
| CN | 110413259 A | 11/2019 |
| CN | 110764836 A | 2/2020 |
| CN | 111596967 A | 8/2020 |
| WO | 2017121928 A1 | 7/2017 |

OTHER PUBLICATIONS

Plug-in (computing), Wikipedia, 2019, 4 pages, [retrieved on Sep. 12, 2023], Retrieved from the Internet: <URL:https://web.archive.org/web/20190827223017/https://en.wikipedia.org/wiki/Plug-in_(computing)>.*

Liu xiao, A Plug-in-Based Integrated Framework for Integrated Application Interface, May 2019, 3 pages.

* cited by examiner

PLUG-IN IMPLEMENTATION METHOD AND PLUG-IN IMPLEMENTATION SYSTEM

CROSS-REFERENCE TO RELATED APPLICATIONS

This application is a continuation of International Application No. PCT/CN2020/107681, filed on Aug. 7, 2020, which claims priority to Chinese Patent Application No. 201910883745.X, filed on Sep. 18, 2019. The disclosures of the aforementioned applications are hereby incorporated by reference in their entireties.

TECHNICAL FIELD

This application relates to the field of electronic devices, and more specifically, to a plug-in implementation method and a plug-in implementation system in an electronic device.

BACKGROUND

Currently, two types of operating systems are mainly applied to electronic devices. One type of operating system is an open-source operating system, for example, an Android™ operating system and a Linux™ operating system. The other type of operating system is a closed-source operating system, for example, an iPhone™ operating system (iOS). For the open-source operating system, each terminal vendor performs in-depth development based on the open-source operating system, adds plug-ins, and customizes terminal software including various plug-ins to extend service functions of terminals.

For ease of description, the open-source operating system is denoted as open-source software. When a plug-in of the terminal software is customized, the plug-in is compiled and developed based on code of the open-source software. In addition, to invoke the plug-in of the terminal software in the open-source software, the code of the open-source software needs to be changed accordingly. Consequently, the open-source software and the terminal software are mutually dependent, and cannot be decoupled from each other.

SUMMARY

This application provides a plug-in implementation system and method. The system includes a plug-in module and a terminal software module extended by a terminal vendor for open-source software. When the terminal software module does not include a service implementation of a first plug-in interface, the plug-in module may load a default implementation of the first plug-in interface to invoke the first plug-in interface. In this way, a plug-in may be extended to extend a service function of a terminal. In addition, when a plug-in interface is inconsistent with a plug-in function, a default implementation of the plug-in interface is implemented by using the plug-in module, so that an open-source software module can run normally, to ensure normal running of an electronic device as much as possible. Therefore, the open-source software module no longer depends on the terminal software module, and the terminal software module can be decoupled from the open-source software module.

According to a first aspect, a plug-in implementation system is provided, where the system includes a plug-in module and a terminal software module. The plug-in module includes a default implementation of a first plug-in interface, and the terminal software module does not include a service implementation of the first plug-in interface. The plug-in module is configured to: obtain a first instruction, where the first instruction is used to load the service implementation of the first plug-in interface; and load the default implementation of the first plug-in interface based on the first instruction.

Therefore, the plug-in module is added to the plug-in implementation system provided in this application. When the terminal software module does not include the service implementation of the first plug-in interface, the plug-in module may load the default implementation of the first plug-in interface to invoke the first plug-in interface. In this way, a plug-in may be extended to extend a service function of a terminal. In addition, when a plug-in interface is inconsistent with a plug-in function, the default implementation of the plug-in interface is implemented by using the plug-in module, so that an open-source software module can run normally, to ensure normal running of an electronic device as much as possible. Therefore, the open-source software module no longer depends on the terminal software module, and the terminal software module can be decoupled from the open-source software module.

Optionally, the plug-in module is specifically configured to: send, to the terminal software module based on the first instruction, a second instruction used to invoke the first plug-in interface; and load the default implementation of the first plug-in interface based on a first feedback instruction that is fed back by the system for the second instruction, where the first feedback instruction is used to indicate that the terminal software module does not include the service implementation of the first plug-in interface.

Therefore, in the plug-in implementation system provided in this application, when the terminal software module does not include the service implementation of the first plug-in interface, the plug-in module may determine, by using the feedback instruction fed back by the system, that the terminal software module does not include the service implementation of the first plug-in interface, and flexibly selects to load the default implementation of the first plug-in interface, so that the open-source software module can run normally, to ensure the normal running of the electronic device as much as possible. In this way, the open-source software module no longer depends on the terminal software module, and the terminal software module can be decoupled from the open-source software module.

Optionally, the terminal software module includes a plug-in service factory, the plug-in module includes a plug-in default factory, and the plug-in default factory includes the first plug-in interface. The plug-in service factory inherits the first plug-in interface, and the terminal software module inherits the default implementation of the first plug-in interface.

The plug-in module is specifically configured to send, to the terminal software module based on the first instruction, a second instruction used to invoke the first plug-in interface.

The terminal software module is configured to load the default implementation of the first plug-in interface based on the second instruction.

Therefore, in the plug-in implementation system provided in this application, the terminal software module may inherit the default implementation of the first plug-in interface in the plug-in module by adding the plug-in service factory to the terminal software module and adding the default plug-in factory to the plug-in module by using a factory mode. In this way, when querying whether the service implementation of the first plug-in interface exists, the system may query only once and needs to query once whether the plug-in service factory exists. When the plug-in module invokes the plug-in interface for a plurality of times, a delay caused by querying can be reduced, and system performance is greatly improved.

Optionally, the system further includes the open-source software module, and the plug-in module is specifically configured to: receive a third instruction sent by the terminal software module, where the third instruction is used to load a first service implementation; and send a fourth instruction to the open-source software module based on a current version of the open-source software module, where the fourth instruction is used to load the first service implementation in the open-source software module of the current version.

Therefore, an adaptation module is added to the plug-in implementation system provided in this application. When the terminal software module needs to load the service implementation of the open-source software module, the adaptation module may send an instruction to the open-source software module based on the current version of the open-source software module, to instruct loading of the service implementation in the open-source software module of the current version. It can be learned that, the adaptation module serves as a bridge between the open-source software module and the terminal software module, and shields a change of the open-source software module. Therefore, when the open-source software module changes, the terminal software module does not change, so that the terminal software module does not depend on the open-source software module.

Optionally, the system further includes the open-source software module. A version number of the terminal software module is a first version, a version number of the open-source software module is a second version, and the first version is different from the second version.

Optionally, the system further includes the open-source software module, and the open-source software module is configured to: change the terminal software module, where a version number of a changed terminal software module is a third version, and the third version is different from the first version.

Optionally, the terminal software module includes a service implementation of a second plug-in interface, and the plug-in module is further configured to: obtain a fifth instruction, where the fifth instruction is used to load the service implementation of the second plug-in interface; and invoke the second plug-in interface based on the fifth instruction, to load the service implementation of the second plug-in interface.

Optionally, the system further includes the open-source software module.

The open-source software module is configured to uninstall the terminal software module.

The plug-in module is configured to: obtain a sixth instruction, where the sixth instruction is used to load the service implementation of the first plug-in interface; determine, based on the sixth instruction, that the terminal software module is not installed in the system; and load the default implementation of the first plug-in interface.

Therefore, in the plug-in implementation system provided in this application, a plug-in loading module determines, based on an instruction that is sent by the open-source software module and used to load a service implementation of a plug-in interface, whether a terminal software module is installed in the system. This effectively avoids abnormal running of the open-source software module caused by uninstallation of the terminal software module. When it is determined that no terminal software module is installed in the system, the plug-in loading module loads a default implementation of the plug-in interface, so that the open-source software module can run normally, to implement the normal running of the electronic device. In this way, the open-source software module no longer depends on the terminal software module.

Optionally, the plug-in module includes the plug-in loading module and a plug-in default implementation module, and the plug-in default implementation module includes the default implementation of the first plug-in interface.

The plug-in loading module is configured to: obtain the first instruction, where the first instruction is used to load the service implementation of the first plug-in interface; and load the default implementation of the first plug-in interface in the plug-in default module based on the first instruction.

Optionally, the first plug-in interface is any one of the following: a dual-card management interface, a full-frequency interface, a hot plug interface, a SkyTone™ interface, and a 5G call interface.

According to a second aspect, a plug-in implementation system is provided, where the system includes an open-source software module, an adaptation module, and a terminal software module.

The terminal software module is configured to send a third instruction to the adaptation module, where the third instruction is used to load a first service implementation.

The adaptation module is configured to send a fourth instruction to the open-source software module based on a current version of the open-source software module, where the fourth instruction is used to load the first service implementation in the open-source software module of the current version.

According to a third aspect, a plug-in implementation method is provided, for use in a system including a plug-in module and a terminal software module, where the plug-in module includes a default implementation of a first plug-in interface, the terminal software module does not include a service implementation of the first plug-in interface, and the method includes: The plug-in module obtains a first instruction, where the first instruction is used to load the service implementation of the first plug-in interface; and the plug-in module loads the default implementation of the first plug-in interface based on the first instruction.

Optionally, that the plug-in module loads the default implementation of the first plug-in interface based on the first instruction includes: The plug-in module sends, to the terminal software module based on the first instruction, a second instruction used to invoke the first plug-in interface; and the plug-in module loads the default implementation of the first plug-in interface based on a first feedback instruction that is fed back by the system for the second instruction, where the first feedback instruction is used to indicate that the terminal software module does not include the service implementation of the first plug-in interface.

Optionally, the terminal software module includes a plug-in service factory, the plug-in module includes a plug-in default factory, and the plug-in default factory includes the first plug-in interface. The plug-in service factory inherits the first plug-in interface, and the terminal software module inherits the default implementation of the first plug-in interface.

That the plug-in module loads the default implementation of the first plug-in interface based on the first instruction includes: The plug-in module sends, to the terminal software module based on the first instruction, a second instruction used to invoke the first plug-in interface; and the terminal software module loads the default implementation of the first plug-in interface based on the second instruction.

Optionally, the system further includes an open-source software module, and the method further includes: The plug-in module receives a third instruction sent by the terminal software module, where the third instruction is used to load a first service implementation; and the plug-in module sends a fourth instruction to the open-source software module based on a current version of the open-source software module, where the fourth instruction is used to load the first service implementation in the open-source software module of the current version.

Optionally, a version number of the terminal software module is a first version, a version number of the open-source software module is a second version, and the first version is different from the second version.

Optionally, the method further includes: changing the terminal software module, where a version number of a changed terminal software module is a third version, and the third version is different from the first version.

Optionally, the terminal software module includes a service implementation of a second plug-in interface, and the method includes: The plug-in module obtains a fifth instruction, where the fifth instruction is used to load the service implementation of the second plug-in interface; and the plug-in module invokes the second plug-in interface based on the fifth instruction, to load the service implementation of the second plug-in interface.

Optionally, the method further includes: uninstalling the terminal software module; the plug-in module obtains a sixth instruction, where the sixth instruction is used to load the service implementation of the first plug-in interface; the plug-in module determines, based on the sixth instruction, that the terminal software module is not installed in the system; and the plug-in module loads the default implementation of the first plug-in interface.

Optionally, the first plug-in interface is any one of the following: a dual-card management interface, a full-frequency interface, a hot plug interface, a SkyTone™ interface, and a 5G call interface.

According to a fourth aspect, a plug-in implementation method is provided, for use in a system including an open-source software module, an adaptation module, and a terminal software module, where the method includes: The terminal software module sends a third instruction to the adaptation module, where the third instruction is used to load a first service implementation; and the adaptation module sends a fourth instruction to the open-source software module based on a current version of the open-source software module, where the fourth instruction is used to load the first service implementation in the open-source software module of the current version.

According to a fifth aspect, a computer program product is provided, where the computer program product includes computer program code, and the computing program code includes the system according to the first aspect and/or the second aspect.

According to a sixth aspect, a computer-readable medium is provided, configured to store a computer program, where the computer program includes the system according to the first aspect and/or the second aspect.

According to a seventh aspect, a chip is provided, including a processor, configured to invoke, from a memory, the system according to the first aspect and/or the second aspect stored in the memory.

According to an eighth aspect, another chip is provided, including an input interface, an output interface, a processor, and a memory, where the input interface, the output interface, the processor, and the memory are connected to each other through an internal connection path, and the processor is configured to execute the system according to the first aspect and/or the second aspect stored in the memory.

According to a ninth aspect, an electronic device is provided, including a display and a processor, where the processor is coupled to a memory, and the memory is configured to store the system according to the first aspect and/or the second aspect.

DESCRIPTION OF EMBODIMENTS

Figure 1:
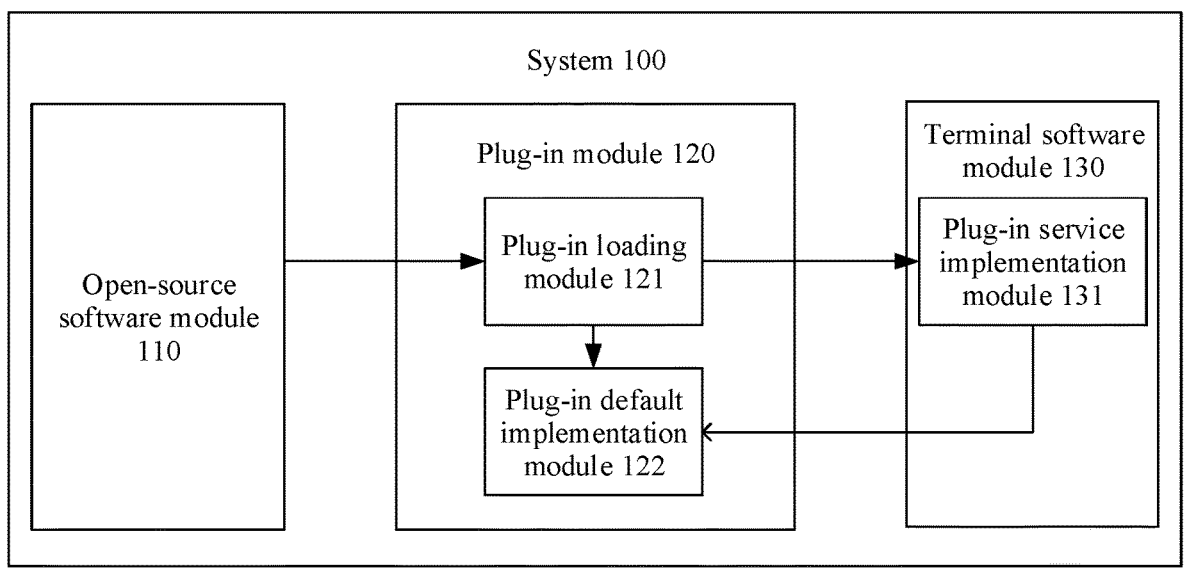
FIG. 1 to FIG. 4 are schematic block diagrams of a plug-in implementation system according to this application.

The following describes the technical solutions in this application with reference to the accompanying drawings.

In the conventional technology, open-source software and terminal software are mutually dependent, and cannot be decoupled from each other. A typical example is that versions of the open-source software and the terminal software need to be consistent. For example, the open-source software may be Android™ software, and the terminal software may be emotion user interface (EMUI) software developed by Huawei™ based on the Android™ software. In embodiments, both the Android™ software and the EMUI software are versions 9.0.

The following describes a design and problems of the open-source software and the terminal software in the conventional technology.

In the conventional technology, it is assumed that a terminal vendor extends three plug-ins and defines three plug-in interfaces, which are used to implement communication between the open-source software and the terminal software. Three plug-in service implementations corresponding to the three plug-in interfaces also need to be installed in the terminal software, to implement plug-in functions of the three plug-ins, so as to ensure consistency between the plug-in interfaces and the plug-in functions and ensure normal running of the open-source software. For example, a plug-in interface is a fifth generation (5G) call interface, and a corresponding plug-in function is a 5G call function. However, the terminal vendor determines, based on various actual situations, that a defined plug-in interface is inconsistent with an implementable plug-in function, and this affects the normal running of the open-source software, and seriously deteriorates user experience.

In a first possible scenario, to reduce coupling and implement flexible combination of the open-source software and the terminal software, the terminal vendor wants to extend a plurality of types of differentiated terminal software for the open-source software, to adapt to different scenario requirements. For example, a version of the open-source software is version 3, and five plug-in interfaces are defined. The terminal software can be deeply developed based on the open-source software of version 3, to generate a plurality of versions of terminal software. Terminal software of version 1 can implement three plug-in functions, terminal software of version 2 can implement four plug-in functions, and terminal software of version 3 can implement five plug-in functions.

In a second possible scenario, to reduce coupling and implement flexible combination of the open-source software and the terminal software, the terminal vendor wants to define a plurality of plug-in interfaces at a time to meet a potential user requirement. However, based on a current user requirement, the current terminal software does not need to have a plug-in function corresponding to each plug-in interface. That is, the plug-in function of the terminal software is inconsistent with the plug-in interface. Subsequently, implementable plug-in functions may be gradually added to the terminal software based on an actual user requirement.

In a third possible scenario, for some reasons, for example, a plug-in of the terminal software is faulty, a service implementation of the plug-in needs to be uninstalled to remove a plug-in function of the plug-in. In this way, code of the terminal software changes. If code of the open-source software does not adaptively change, a terminal cannot be powered on, or a function of the open-source software is abnormal, and the terminal cannot be normally used. In the conventional technology, to ensure normal running of the terminal, the code of the open-source software needs to accordingly change. For example, if a version of the terminal software is rolled back, a version of the open-source software also needs to be rolled back. If the version of the terminal software is upgraded, the version of the open-source software also needs to be upgraded, to ensure that the plug-in interface is consistent with the plug-in function of the terminal software, so as to ensure the normal running of the open-source software.

In conclusion, the open-source software depends on the terminal software. When a plug-in function of the terminal software is inconsistent with a plug-in interface defined by the terminal vendor, the normal running of the open-source software is seriously affected, and normal running of an electronic device is affected. Based on this, this application provides a plug-in implementation system and method. The system includes a plug-in module extended by a terminal vendor for open-source software. The plug-in module defines one or more plug-in interfaces, and may provide a default capability of a function of the plug-in interface. The open-source software may implement a plug-in function of terminal software by using the plug-in module. In addition, when the plug-in interface is inconsistent with the plug-in function, the default capability provided by the plug-in module may be used to ensure normal running of the open-source software as much as possible, so that the open-source software does not depend on the terminal software. The plug-in module includes a plug-in loading module and a plug-in default implementation module. The plug-in default implementation module includes a plug-in default implementation that is in a one-to-one correspondence with the at least one plug-in interface. The plug-in loading module may determine, based on an instruction that is sent by the open-source software and used to load a service implementation of a plug-in interface, whether the terminal software includes the service implementation of the plug-in interface. If the terminal software includes the service implementation of the plug-in interface, the plug-in loading module loads the service implementation of the plug-in interface. If the terminal software does not include the service implementation of the plug-in interface, the plug-in loading module loads a default implementation of the plug-in interface. In this way, a plug-in may be extended to extend a service function of a terminal. In addition, when the plug-in interface is inconsistent with the plug-in function, the default implementation or the service implementation of the plug-in interface may be implemented by using the plug-in module, and this implements the normal running of the open-source software, and implements normal running of an electronic device.

It may be understood that the open-source software sends a command related to a plug-in interface. Regardless of the default implementation or the service implementation of the plug-in interface is implemented by using the plug-in module, for the open-source software, the command being completed is presented, or a function of the plug-in interface being completed is presented (although the function that is implemented through the default implementation is not a plug-in function of the plug-in interface). Therefore, the normal running of the open-source software and the normal running of the electronic device can be implemented.

Compared with the conventional technology, in a first possible scenario in this application, a plurality of versions of differentiated terminal software may be extended for a same open-source software, to implement a requirement of a scenario in which the plug-in interface is inconsistent with the plug-in function. In a second possible scenario in this application, a plurality of plug-in interfaces may be defined at a time, and plug-in functions are accordingly added for a plurality of times based on a user requirement, to meet a potential user requirement. In a third possible scenario in this application, only the terminal software needs to change, and the open-source software does not need to change. For example, only the terminal software is upgraded, and the Android software is not upgraded.

FIG. 1 is a schematic diagram of a plug-in implementation system according to this application. A system 100 includes an open-source software module 110, a plug-in module 120, and a terminal software module 130. The open-source software module 110 includes source code of an open-source system. For example, the open-source system may be an Android operating system or a Linux operating system. The plug-in module 120 is configured to provide a default capability of a plug-in interface extended by a terminal vendor. When an actual function of the plug-in interface cannot be implemented in the terminal software module 130, the default capability of the plug-in interface is implemented to ensure normal running of the system as much as possible. The terminal software module 130 is terminal software that is defined by the terminal vendor and developed based on open-source software and that has a terminal personalized style, to implement the actual function of the plug-in interface extended by the terminal vendor. The following describes in detail content of the plug-in module 120 and the terminal software module 120.

Plug-in interfaces of M plug-ins are defined in the plug-in module 120, and are configured to implement communication between the Android software 110 and the terminal software 130. The plug-in module 120 includes a plug-in loading module 121 and a plug-in default implementation module 122.

The plug-in default implementation module 122 includes default implementations of the M plug-in interfaces. For a same plug-in interface, a default implementation of the plug-in interface corresponds to a service implementation of the plug-in interface. The service implementation of the plug-in interface may be understood as a real implementation of the plug-in interface and can implement an actual function of the plug-in interface. The default implementation of the plug-in interface may be understood as a false implementation of the plug-in interface. When the service implementation of the plug-in interface cannot be implemented, the default implementation of the plug-in interface is implemented. Alternatively, it may be understood that the service implementation of the plug-in interface is an enhanced function of the default implementation of the plug-in interface.

Optionally, the M plug-in interfaces may include at least one of the following: a dual-card management interface, a full-frequency interface, a hot plug interface, a SkyTone™ interface, and a 5G call interface.

The following describes the service implementation and the default implementation of the plug-in interface with reference to the plug-in interface.

For example, if the plug-in interface is a 5G call interface, a service implementation of the 5G call interface is a 5G call function, and a default implementation of the 5G call interface may be any one of a fourth generation (4G) call function, a third generation (3G) call function, or a second generation (2G) call function.

For another example, if the plug-in interface is a dual-card management interface, a service implementation of the dual-card management interface is a dual-card management function, and a default implementation of the dual-card management interface may be a single-card management function.

For another example, if the plug-in interface is a hot plug interface, a service implementation of the hot plug interface is a hot plug function. The hot plug function is that when a peripheral device is connected to the electronic device, the electronic device may sense the peripheral device and transmit a signal to the peripheral device without restarting. A default implementation of the hot plug interface is that when a peripheral device is connected to the electronic device, the electronic device needs to be restarted and scan to sense the peripheral device.

For another example, if the plug-in interface is a full-frequency interface, a service implementation of the full-frequency interface is a full-frequency function. The full-frequency function is that the electronic device can support various operators, and when a user switches from one operator to another operator, the electronic device can be connected to a network provided by each operator. A default implementation of the full-frequency interface may be that the electronic device supports one operator, and the user may connect the electronic device to a network provided by the operator, but cannot connect the electronic device to a network provided by another operator.

Optionally, the default implementation of the plug-in interface may be an inherent service implementation in the open-source software module, or may be a blank implementation, or may be a service implementation extended by the terminal vendor. This is not limited in this application. The following separately describes the three cases.

For example, it is assumed that a 4G call function is inherent in the open-source software module 110, the terminal vendor wants to upgrade the 4G call function to extend a 5G call function, and the plug-in interface is a 5G call interface. In this case, the 4G call function inherent in the open-source software module 110 may be used as the default implementation of the 5G plug-in interface.

For another example, it is assumed that a 3G call function is inherent in the open-source software module 110, and the terminal vendor upgrades the 3G call function twice to implement a 4G call function and a 5G call function respectively. In this case, the 4G call function extended by the terminal vendor may be used as the default implementation of the 5G call interface.

For another example, it is assumed that the terminal vendor needs to extend a plug-in function of a plug-in interface, and the open-source software module 110 does not include a low configuration of the plug-in function, for example, a SkyTone™ function. In this case, a blank implementation may be used as a default implementation of the plug-in interface.

The plug-in loading module 121 may determine, based on an instruction that is sent by the open-source software module 110 and used to invoke a service implementation of a plug-in interface, whether the terminal software module 130 includes the service implementation of the plug-in interface. If the terminal software module 130 includes the service implementation of the plug-in interface, the plug-in loading module 121 loads the service implementation of the plug-in interface. If the terminal software module 130 does not include the service implementation of the plug-in interface, the plug-in loading module 121 loads a default implementation of the plug-in interface.

The terminal software module 130 includes a plug-in service implementation module 131, where the plug-in service implementation module 131 includes service implementations of N plug-in interfaces. A relationship between the N plug-in interfaces and the M plug-in interfaces is explained by using an example in which the M plug-in interfaces defined in the plug-in module 120 include a full-frequency interface, a hot plug interface, and a dual-card management interface, and the plug-in module 120 includes default implementations of three plug-in interfaces.

Optionally, the N plug-in interfaces may be the M plug-in interfaces defined by the terminal vendor in the plug-in module 120. In other words, the terminal software module 130 has plug-in functions of the M plug-in interfaces. For example, the terminal software module 130 has a full-frequency function, a hot plug function, and a dual-card management function. In this case, the plug-in interface is consistent with the plug-in function.

The following describes a case in which the plug-in interface is inconsistent with the plug-in function.

Optionally, the N plug-in interfaces may include some of the M plug-in interfaces. In other words, although the terminal vendor defines the M plug-in interfaces in the plug-in module 120, the terminal software module 130 has plug-in functions of only some of the M plug-in interfaces. For example, the terminal software module 130 has any plug-in function of a full-frequency function, a hot plug function, and a dual-card management function, or the terminal software module 130 has any two plug-in functions of a full-frequency function, a hot plug function, and a dual-card management function.

Optionally, the N plug-in interfaces may include some of the M plug-in interfaces and another plug-in interface, and the another plug-in interface does not belong to the M plug-in interfaces. However, in this case, the terminal software module 130 can implement plug-in functions of only some of the M plug-in interfaces, and cannot implement a function of the another plug-in interface temporarily. For example, the terminal software module 130 has a full-frequency function and a 5G call function, where a 5G call interface corresponding to the 5G call function is not a plug-in interface defined in the plug-in module 120.

Optionally, the N plug-in interfaces may include the M plug-in interfaces and another plug-in interface. In this case, the terminal software module 130 can implement only plug-in functions of the M plug-in interfaces, and cannot implement a function of the another plug-in interface temporarily. For example, the terminal software module 130 not only has a full-frequency function, a hot plug function, a dual-card management function, and a 5G call function, where a 5G call interface corresponding to the 5G call function is not a plug-in interface defined in the plug-in module 120.

Figure 2:
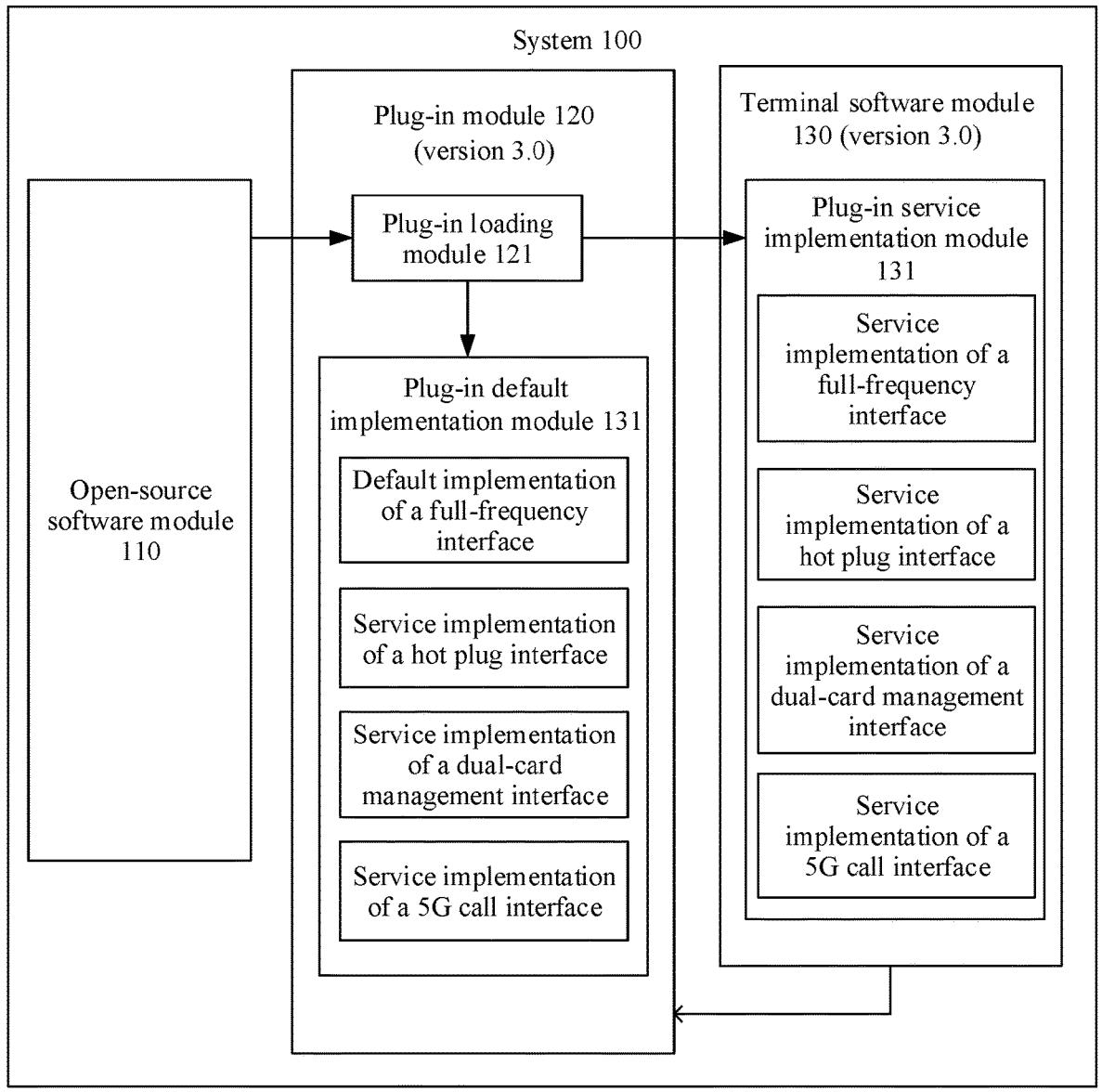

For example, still refer to FIG. 2. The plug-in service implementation module 131 points to the plug-in default implementation module 122 by using an arrow. This indicates that the service implementation and the corresponding default implementation of the plug-in interface are implemented in an inheritance manner, where the default implementation is a parent class, and the service implementation is a subclass. This design can ensure external uniformity of the plug-in interface. That is, regardless of the default implementation or the service implementation of the plug-in interface is implemented by using the plug-in module, for the open-source software module, the M plug-in interfaces defined by the terminal vendor are always presented.

Figure 3:
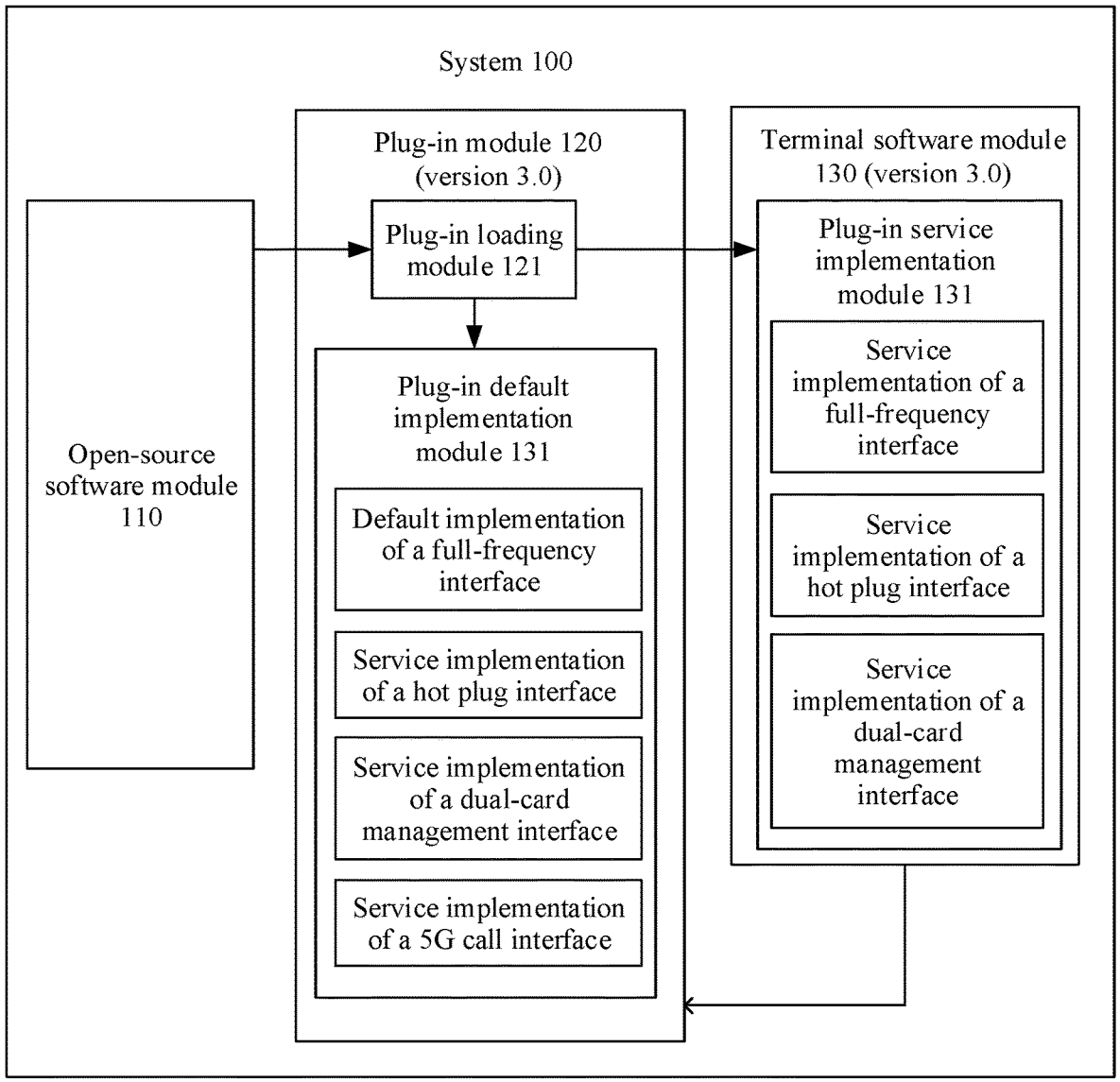
Figure 4:
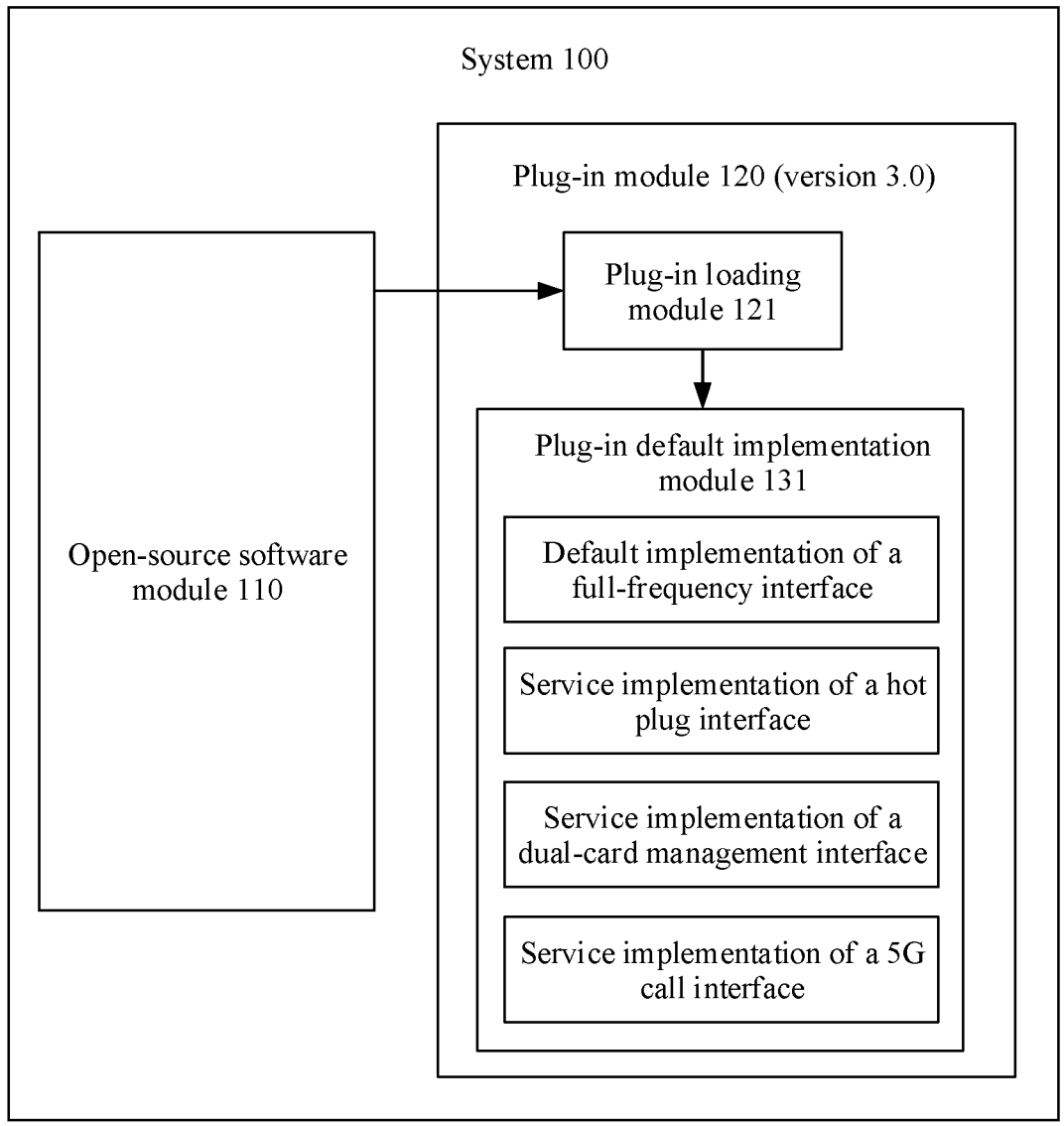

FIG. 2 to FIG. 4 are other schematic diagrams of the plug-in implementation system according to this application. It should be understood that the system shown in FIG. 2 to FIG. 4 is merely an example for description, and shall not constitute a limitation on this application.

FIG. 2 may correspond to a case in which a plug-in interface is consistent with a plug-in function. For example, four plug-in interfaces are defined in the plug-in module 120. Accordingly, the plug-in loading module 121 may invoke the four plug-in interfaces, and the plug-in default implementation module 121 includes default implementations of the four plug-in interfaces. The terminal software module 130 may implement plug-in functions of the four plug-in interfaces, and the plug-in service implementation module 131 includes service implementations of the four plug-in interfaces. For example, it may be considered that a version of the plug-in module 120 is consistent with a version of the terminal software module 130, for example, both are versions 3.0.

FIG. 3 may correspond to a case in which a plug-in interface is inconsistent with a plug-in function. For example, four plug-in interfaces are defined in the plug-in module 120. Accordingly, the plug-in loading module 121 may invoke the four plug-in interfaces, and the plug-in default implementation module 121 includes default implementations of the four plug-in interfaces. The terminal software module 130 may implement plug-in functions of only three of the four plug-in interfaces, and the plug-in service implementation module 131 includes service implementations of the three plug-in interfaces. Subsequently, the terminal vendor may install a service implementation of the remaining plug-in interface in the terminal software module 130 based on an actual requirement. For example, in an implementation, it may be considered that a version number of the plug-in module 120 is different from a version number of the terminal software module 130. For example, a version of the plug-in module 120 is 3.0, and a version of the terminal software module 130 is 2.0. Subsequently, the terminal software module may be upgraded to version 3.0 based on an actual requirement, and the service implementation of the remaining plug-in interface is added to the plug-in module 120, so that the plug-in interface is consistent with a plug-in function.

It should be understood that a case as shown in FIG. 3 in which the plug-in interface is inconsistent with the plug-in function does not exist in conventional technology. Otherwise, the open-source software module cannot run, and the electronic device cannot be powered on, or a system function is severely abnormal, and the electronic device is unavailable. However, in this application, the plug-in interface is inconsistent with the plug-in function, which indicates that the version numbers of the plug-in module 120 and the terminal software module 130 are inconsistent. However, the inconsistency does not affect normal running of the open-source software module and the electronic device. The plug-in module intelligently determines and loads a service implementation in the terminal software module.

It should be noted that the case in which the plug-in interface is inconsistent with the plug-in function may also include the following case. For example, the terminal vendor defines three plug-in interfaces in the plug-in module 120, and the plug-in service implementation module 131 of the terminal software module 130 may include service implementations of the three plug-in interfaces and a service implementation of another plug-in interface. However, the electronic device can implement only plug-in functions of the three plug-in interfaces, and cannot implement a plug-in function of the another plug-in interface. Subsequently, based on an actual situation, for example, when the plug-in function of the another plug-in interface is relatively stable, the another plug-in interface may be added to the plug-in module, to implement the plug-in function of the another plug-in interface. For example, in an implementation, it may be considered that a version of the plug-in module 120 is different from a version of the terminal software module 130. For example, the version of the plug-in module is 2.0, and the version of the terminal software module 130 is 3.0. Subsequently, the version of the plug-in module 120 is upgraded to 3.0 to be consistent with the plug-in function.

Refer to FIG. 4. In some scenarios, for example, if the terminal software module 130 is faulty and runs unstably, the terminal software module 130 may be uninstalled. In this case, the system 100 includes the open-source software module 110 and the plug-in module 120. When the system 100 does not include the terminal software module 130, a default implementation in the plug-in module 120 may be loaded to implement a requirement of the open-source software module 110 for a function of a plug-in interface.

It should be understood that, in the conventional technology, a case shown in FIG. 4 in which the system includes only the plug-in interface and does not include the terminal software module does not exist. Otherwise, the open-source software module cannot run, and the electronic device cannot be powered on, or a system function is severely abnormal, and the electronic device is unavailable. However, in this application, running of the open-source software module does not depend on the terminal software module, and the open-source software can still run normally after the terminal software module is uninstalled.

Figure 5:
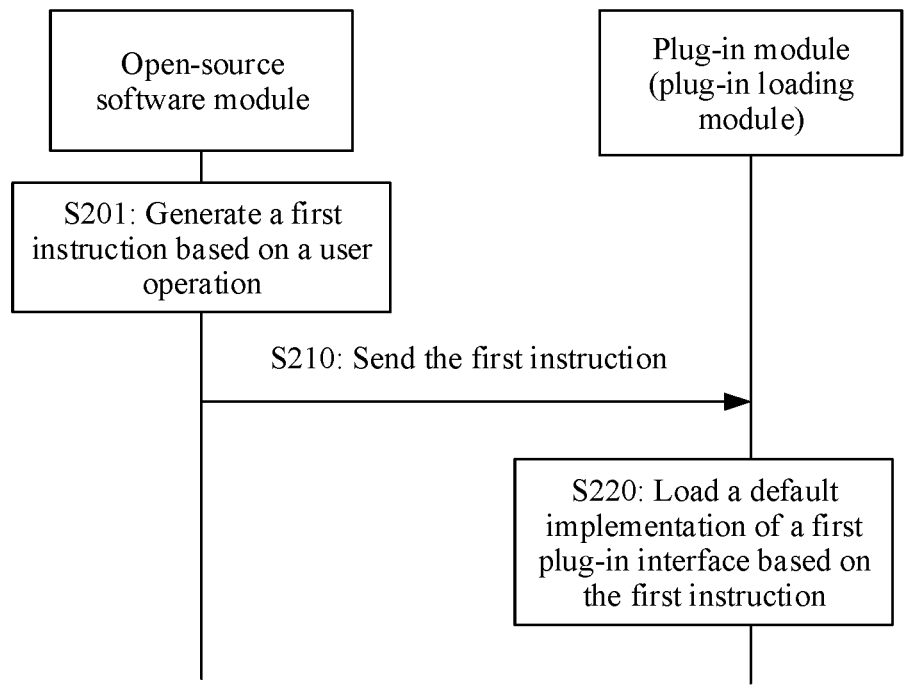
FIG. 5 to FIG. 7 are schematic flowcharts of a plug-in implementation method according to this application.
Figure 6:
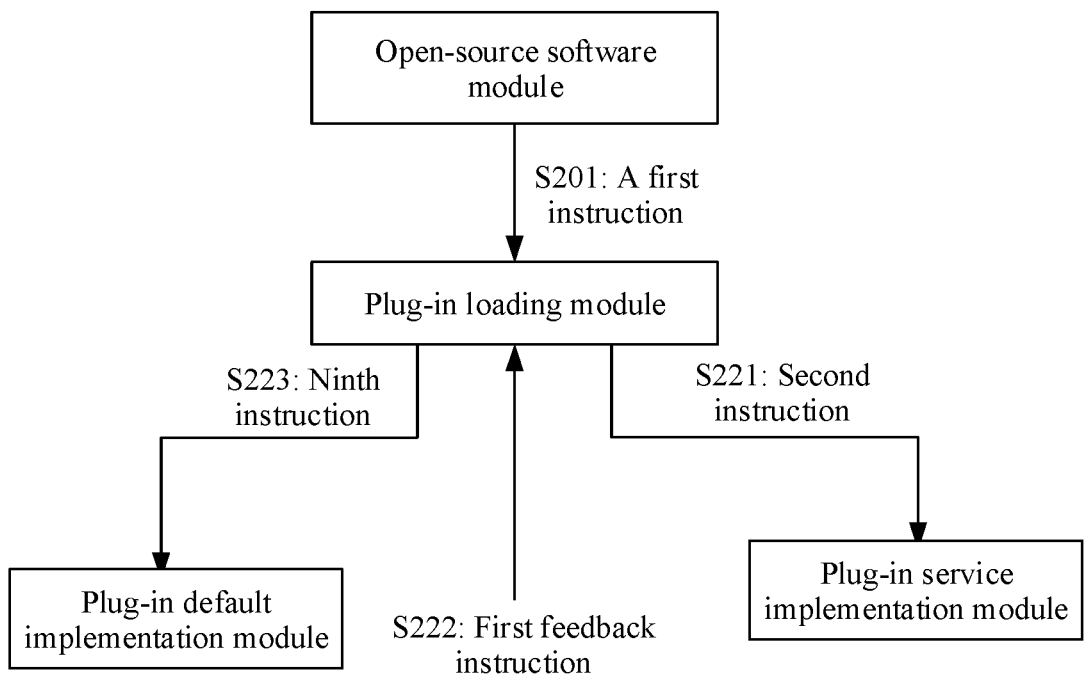
Figure 7:
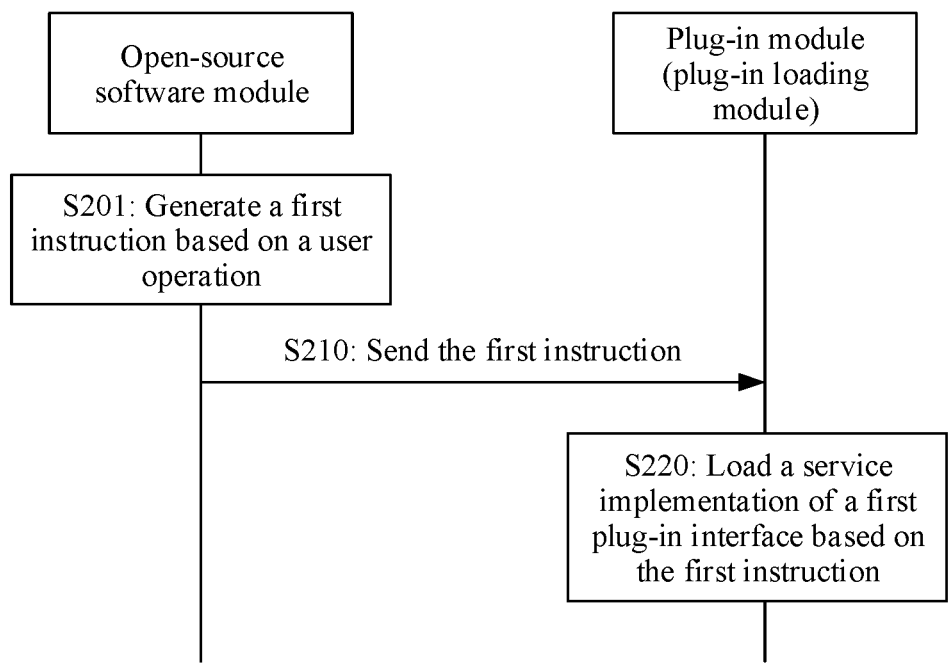

The plug-in implementation system provided in this application is described in detail above with reference to FIG. 1 to FIG. 4. With reference to FIG. 5 to FIG. 7, a plug-in implementation method provided in this application is described in detail. Modules in the embodiments corresponding to FIG. 5 to FIG. 7 may correspond to the modules in FIG. 1.

The following separately describes two cases in which a plug-in module loads a default implementation of a plug-in interface and loads a service implementation of the plug-in interface.

Case 1 (the Plug-In Module Loads the Default Implementation of the Plug-In Interface)

This case may correspond to the embodiments shown in FIG. 5 and FIG. 6.

For ease of description, this application is described by using a first plug-in interface in M plug-in interfaces defined by a terminal vendor as an example, that is, using an example in which the plug-in module includes a default implementation of the first plug-in interface, and a terminal software module does not include a service implementation of the first plug-in interface.

It should be understood that the plug-in module may further include default implementations of other M-1 plug-in interfaces. It should be further understood that the terminal software module does not include the service implementation of the first plug-in interface, and may include a service implementation of another plug-in interface. The another plug-in interface may be the M-1 plug-in interfaces, may be some of the M-1 plug-in interfaces, may be some of the M-1 plug-in interfaces and a plug-in interface that does not exist in the plug-in module, or may be a plug-in interface that does not exist in the M plug-in interfaces and the plug-in module. This is not limited in this application. For example, the first plug-in interface may be a 5G plug-in interface, and the another plug-in interface may be at least one of a full-frequency interface, a hot plug interface, and a dual-card management interface.

In S201, an open-source software module generates a first instruction based on a user operation, where the first instruction is used to load the service implementation of the first plug-in interface.

For example, the user operation may be an operation in various forms. This is not limited in this application. For example, the user operation may be a tap operation, a swipe operation, or the like performed by a user on a display of an electronic device, or may be a voice input by the user. Based on the user operation, the open-source software module generates the first instruction corresponding to the user operation, where the first instruction is used to load the service implementation of the first plug-in interface. It may be understood that, the user wants a system to implement a plug-in function of the first plug-in interface through the user operation, so as to meet a requirement.

Call making is used as an example. The user enters a user operation by dialing a number and tapping a call button. The open-source software module learns, based on the user operation, that the user wants to make a call. In addition, because a 5G call interface is defined in the plug-in module, the open-source software module preferentially makes a call through a 5G network. Therefore, the first instruction related to a 5G call function may be generated. The first plug-in interface is a 5G plug-in interface. The first instruction may be a 5G call instruction used to implement the 5G call function, or may be a call instruction used to implement a call function. If the first instruction is a call instruction, the plug-in loading module preferentially invokes the 5G call interface based on the call instruction.

In S210, the open-source software module sends the first instruction. Accordingly, the plug-in loading module receives the first instruction.

In S220, the plug-in loading module loads the default implementation of the first plug-in interface based on the first instruction.

It may be understood that when a plug-in service implementation module does not include the service implementation of the first plug-in interface, the plug-in loading module cannot load the service implementation of the first plug-in interface. Therefore, in this application, the plug-in loading module can load the default implementation of the first plug-in interface in the plug-in default implementation module.

Therefore, according to the plug-in implementation method provided in this application, when the terminal software module does not include the service implementation of the first plug-in interface, the plug-in module loads the default implementation of the first plug-in interface to invoke the first plug-in interface. In this way, a plug-in may be extended to extend a service function of a terminal. In addition, when a plug-in interface is inconsistent with a plug-in function, a default implementation or a service implementation of the plug-in interface may be implemented by using the plug-in module, so that the open-source software module can run normally, to ensure normal running of the electronic device as much as possible. In this way, the open-source software module no longer depends on the terminal software module, and the terminal software module can be decoupled from the open-source software module.

For example, the plug-in loading module may determine, based on the first instruction, that the plug-in service implementation module does not include the service implementation of the first plug-in interface, and further load the service implementation of the first plug-in interface.

With reference to FIG. 6, step S220 is described by using steps S221, S222, and S223 in the following.

In S221, the plug-in loading module sends, to the plug-in service implementation module based on the first instruction, a second instruction used to invoke the first plug-in interface.

The plug-in loading module may determine, based on the first instruction, that the open-source software module wants to invoke the first plug-in interface to implement the plug-in function of the first plug-in interface. Therefore, the plug-in loading module may invoke the first plug-in interface by using the second instruction, to load the service implementation of the first plug-in interface and implement the plug-in function of the first plug-in interface.

Optionally, before sending the second instruction to the plug-in service implementation module, the plug-in loading module may send an instruction to the system, to determine whether the terminal software module is installed in the system. In this way, when the terminal software module shown in FIG. 4 is uninstalled, abnormal running of the open-source software module caused by the terminal software module being uninstalled can be effectively avoided through this step.

For example, the system may determine, based on the instruction sent by the plug-in loading module, whether a terminal software module is installed in the system. If no terminal software module is installed in the system, the system sends a feedback instruction to the plug-in loading module to indicate that no terminal software module is installed in the system. If the terminal software module is installed in the system, the plug-in loading module sends, to the plug-in service implementation module without receiving the feedback instruction sent by the system, the second instruction used to invoke the first plug-in interface.

In S222, the plug-in loading module receives a first feedback instruction sent by the system for the second instruction, where the first feedback instruction is used to indicate that the terminal software module (the plug-in service implementation module) does not include the service implementation of the first plug-in interface.

That is, the system may determine whether the plug-in service implementation module includes the service implementation of the first plug-in interface. If the plug-in service implementation module does not include the service implementation of the first plug-in interface, the system sends the first feedback instruction to the plug-in loading module, so that the plug-in loading module may determine that the plug-in service implementation module does not include the service implementation of the first plug-in interface. In this way, the plug-in loading module may load the default implementation of the first plug-in interface.

In S223, the plug-in loading module sends a ninth instruction to the plug-in default implementation module based on the first feedback instruction, to load the default implementation of the first plug-in interface.

For example, the first plug-in interface is a 5G call interface in the following. The embodiment of this application is further described with reference to Case 1.

It is assumed that the 5G call interface is defined in the plug-in module, the plug-in default implementation module includes a default implementation of the 5G call interface, the default implementation is a 4G call function, and the plug-in service implementation module in the terminal software module does not include a service implementation of the 5G plug-in interface, that is, does not include a 5G call function.

1. The user enters a user operation by dialing a number and tapping the call button. The open-source software module generates the first instruction based on the user operation, and sends the first instruction. Optionally, the first instruction is a call instruction.

2. The plug-in loading module learns, based on the call instruction, that the user wants to make a call. In addition, because the 5G call interface is defined in the plug-in module, a 5G call is preferred. The plug-in loading module sends the second command to the plug-in service module to invoke the 5G call interface, where the second command may be denoted as a 5G call command.

3. The system may determine that the plug-in service implementation module does not include the service implementation of the 5G plug-in interface, and send the first feedback command to the plug-in loading module.

4. The plug-in loading module loads the default implementation of the 5G call interface based on the first feedback instruction, that is, implements the 4G call function.

Optionally, when implementing the 4G call function, the plug-in loading module may notify, in a possible manner, the user that the 4G call function is currently implemented, so that the user can independently select whether to use the current 4G call function. For example, the possible manner may be popping up an interface window, outputting a voice prompt, or the like.

Case 2 (the Plug-In Module Loads the Service Implementation of the Plug-In Interface)

This case may correspond to the embodiment shown in FIG. 7.

For ease of description, this application is described by using a first plug-in interface in M plug-in interfaces defined by a terminal vendor as an example, that is, using an example in which the plug-in module includes a default implementation of the first plug-in interface, and a terminal software module includes a service implementation of the first plug-in interface. It should be understood that the plug-in module may alternatively include a default implementation of another plug-in interface, and the terminal software module may alternatively include a service implementation of the another plug-in interface. This is not limited in this application.

In S201, an open-source software module generates a first instruction based on a user operation, where the first instruction is used to load the service implementation of the first plug-in interface.

For descriptions of this step, refer to related descriptions of step S201 in Case 1. Details are not described herein again.

In S210, the open-source software module sends the first instruction. Accordingly, a plug-in loading module receives the first instruction.

In S230, the plug-in loading module loads the service implementation of the first plug-in interface based on the first instruction.

It may be understood that, when a plug-in service implementation module includes the service implementation of the first plug-in interface, a plug-in function of the first plug-in interface may be implemented. That is, the plug-in loading module may load the service implementation of the first plug-in interface.

Optionally, when the plug-in service implementation module includes the service implementation of the first plug-in interface, that the plug-in loading module loads the service implementation of the first plug-in interface based on the first instruction includes: The plug-in loading module may send, to the plug-in service implementation module based on the first instruction, a second instruction used to invoke the first plug-in interface.

The plug-in service implementation module may load the service implementation of the first plug-in interface based on the second instruction.

It may be understood that the plug-in loading module may load the service implementation of the first plug-in interface by using the plug-in service implementation module.

For descriptions about sending the second instruction by the plug-in loading module, refer to related descriptions of step S221 in case 1. Details are not described herein again.

Optionally, the plug-in service implementation module sends a second feedback instruction to the plug-in loading module, where the second feedback instruction is used to indicate that the plug-in loading module successfully invokes the service implementation of the first plug-in interface. Alternatively, the second feedback instruction may be used to indicate that the plug-in service implementation module includes the service implementation of the first plug-in interface.

Still for example, the first plug-in interface is a 5G call interface in the following. The embodiment of this application is further described with reference to Case 2.

It is assumed that the 5G call interface is defined in the plug-in module, the plug-in default implementation module includes a default implementation of the 5G call interface, the default implementation is a 4G call function, and the plug-in service implementation module in the terminal software module includes a service implementation of the 5G plug-in interface, that is, includes a 5G call function.

1. The user enters a user operation by dialing a number and tapping the call button. The open-source software module generates the first instruction based on the user operation, and sends the first instruction. Optionally, the first instruction is a call instruction.

2. The plug-in loading module learns, based on the call instruction, that the user wants to make a call. In addition, because the 5G call interface is defined in the plug-in module, a 5G call is preferred. The plug-in loading module sends the second command to the plug-in service module to invoke the 5G call interface, where the second command may be denoted as a 5G call command.

3. The plug-in loading module loads the service implementation of the 5G call interface based on the 5G call command, that is, implements the 5G call function.

In this application, whether a service implementation of a plug-in interface exists may be queried by using a reflection mechanism, and the query process is time-consuming and requires high performance overheads. When the plug-in loading module invokes a plurality of plug-in interfaces by using a plurality of instructions, one instruction invokes one plug-in interface. When querying and determining, by using the reflection mechanism, whether the service implementation of the plug-in interface exists, the system needs to perform query several times to determine whether the service implementation of the plug-in interface exists. It is assumed that the plug-in loading module invokes an instruction of a plug-in interface, and a process in which the system queries whether a service implementation of the plug-in interface exists takes 0.1 ms. If there are 10 instructions used to invoke the plug-in interface, the query process takes 1 ms. This causes a long delay and affects system performance.

Based on this, in this application, a factory mode is proposed. That is, a plug-in service factory is added. A quantity of query times of the system can be reduced by using the plug-in service factory, to improve system performance. For example, the foregoing 10 instructions are still used as an example. In the conventional technology, the system needs to perform query for 10 times, and the process takes 1 ms. However, in this application, the system performs query only once by using the plug-in service factory. The system queries, based on the first instruction, whether the plug-in service factory exists. Because it has been determined whether the plug-in service factory exists, the system does not need to perform query based on a subsequent instruction. This greatly reduces a delay and improves system performance. The following describes a plug-in implementation system provided in this application with reference to FIG. 8. Further, the system shown in FIG. 8 is used as an example to describe a plug-in implementation method provided in this application with reference to FIG. 9.

Figure 8:
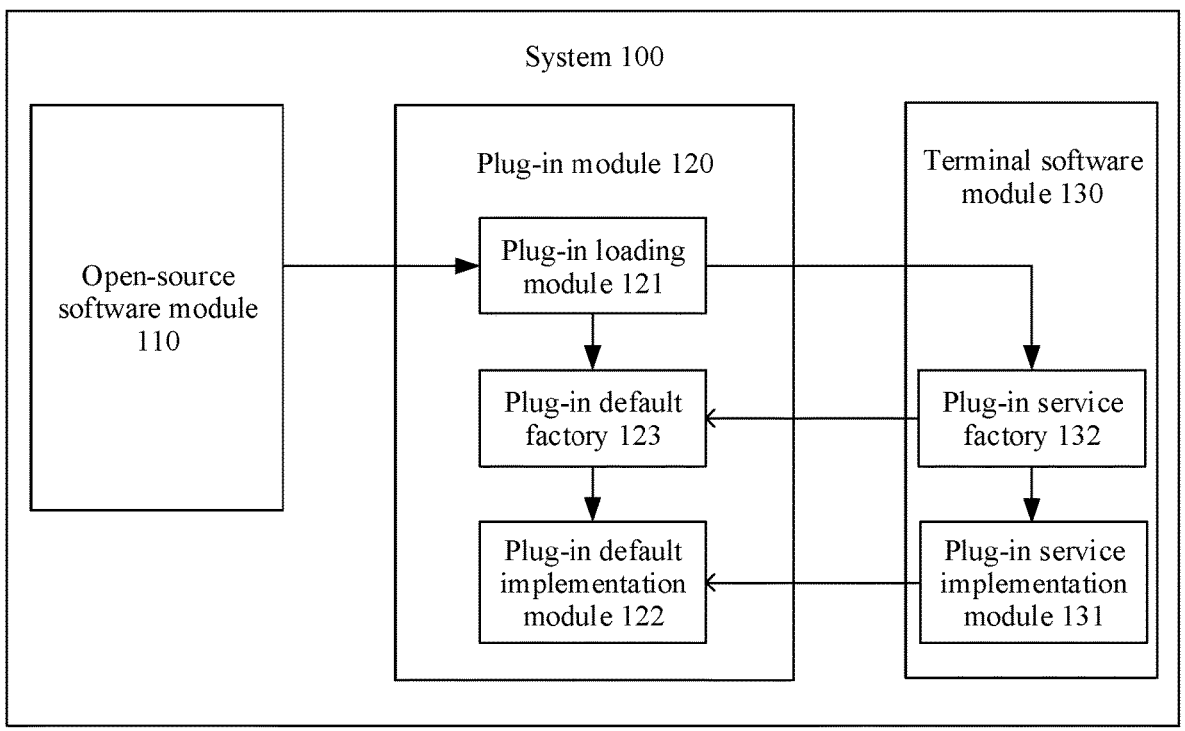
FIG. 8 is another schematic block diagram of a plug-in implementation system according to this application.

FIG. 8 is another schematic diagram of a plug-in implementation system according to this application. Compared with the system shown in FIG. 1 to FIG. 4, in the system shown in FIG. 8, a plug-in default factory 123 is added to a plug-in module 120, and a plug-in service factory 132 is added to a terminal software module 130. For example, the plug-in service factory 132 and the plug-in default factory 123 are also implemented in an inheritance manner. The plug-in default factory 123 is a parent class, and the plug-in service factory 132 is a subclass. This design can ensure external uniformity of a plug-in interface.

The plug-in module 120 defines M plug-in interfaces, the plug-in default factory 123 includes the M plug-in interfaces, and a plug-in default implementation module includes default implementations of the M plug-in interfaces.

A plug-in service implementation module 131 of the terminal software module 130 may include service implementations of N plug-in interfaces. For a relationship between the N plug-in interfaces and the M plug-in interfaces, refer to the foregoing description. Details are not described herein again. When the plug-in service implementation module 131 includes service implementations of the M plug-in interfaces, the plug-in service factory also includes the M plug-in interfaces, and can implement a plug-in function of each plug-in interface. When the plug-in service implementation module 131 includes service implementations of M1 of the M plug-in interfaces, and M1 is less than or equal to N, the plug-in service implementation module 131 inherits default implementations of M-M1 of the M plug-in interfaces. The plug-in service factory 132 inherits the M-M1 plug-in interfaces. That is, it can be seen from a final result that, the plug-in service factory 132 includes the M plug-in interfaces, and the plug-in service implementation module 131 includes the service implementations of the M1 plug-in interfaces and the default implementations of the M-M1 plug-in interfaces. From a perspective of a plug-in loading module, the plug-in service factory 132 provides the M plug-in interfaces, and can implement the M functions. The plug-in loading module does not consider whether the M functions are implemented by using the default implementations or the service implementations. Therefore, provided that the terminal software module 130 is installed in the system, the plug-in loading module 121 can successfully invoke a service implementation or a default implementation of a plug-in interface by using the plug-in service factory 132, regardless of whether the plug-in service implementation module 131 includes the service implementation of the plug-in interface. However, when the plug-in service implementation module 131 does not include the service implementation of the plug-in interface, the default implementation of the plug-in interface is implemented. When the plug-in service implementation module 131 includes the service implementation of the plug-in interface, and the plug-in interface belongs to the M plug-in interfaces, the service implementation of the plug-in interface is implemented.

For example, the system may include a plurality of plug-in service factories. Each plug-in service factory corresponds to one service type. The plug-in interfaces are classified to different plug-in service factories based on the service types. Accordingly, a type of a plug-in default factory corresponds to a type of a plug-in service factory. It is assumed that the system includes three plug-in service factories and three plug-in default factories, respectively corresponding to a multimedia service, a short-range communications service, and a communications service. The M plug-in interfaces may be classified into three types. A plug-in interface corresponding to the multimedia service belongs to the plug-in default factory corresponding to the multimedia service, a plug-in interface corresponding to the short-range communications service belongs to the plug-in default factory corresponding to the short-range communication service, and a plug-in interface corresponding to the communications service belongs to the plug-in default factory corresponding to the communications service. The plug-in service factory corresponding to the multimedia service inherits the plug-in interface of the plug-in default factory corresponding to the multimedia service, the plug-in service factory corresponding to the short-range communications service inherits the plug-in interface of the plug-in default factory corresponding to the short-range communications service, and the plug-in service factory corresponding to the communications service inherits the plug-in interface of the plug-in default factory corresponding to the communications service.

In this way, the plug-in interfaces can be classified by using a factory mode, and the plug-in interfaces of the same class make the code logic clearer. For example, all the plug-in interfaces of the multimedia type are placed in the plug-in service factory of the multimedia type.

It should be understood that the foregoing scenarios in FIG. 2 to FIG. 4 may also be completely corresponding to the system in FIG. 8. Only a plug-in default implementation needs to be added to the plug-in module in FIG. 2 to FIG. 4 and a plug-in service factory needs to be added to the terminal software module in FIG. 2 to FIG. 4. For brevity, details are not described herein again.

Figure 9:
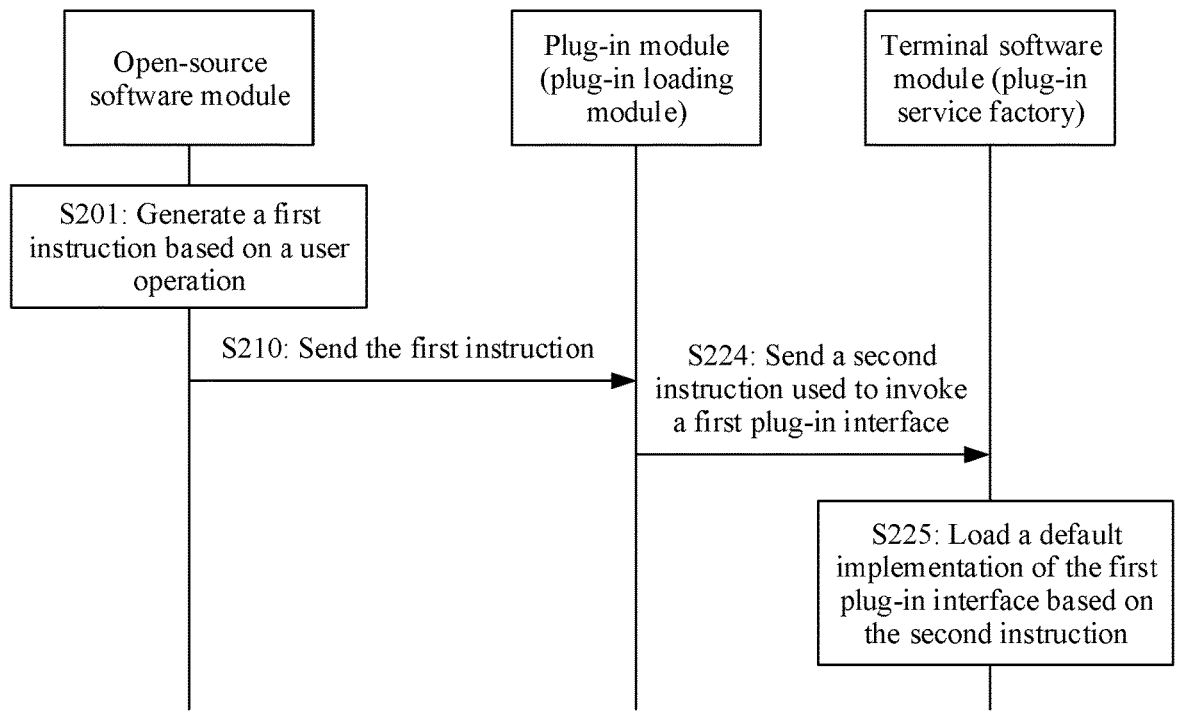
FIG. 9 is another schematic flowchart of a plug-in implementation method according to this application.

FIG. 9 is a schematic diagram of a plug-in implementation method according to this application. Modules in the embodiment corresponding to FIG. 9 may correspond to the modules in FIG. 8.

Similarly, for ease of description, this application is described by using a first plug-in interface in M plug-in interfaces defined by a terminal vendor as an example, that is, using an example in which the plug-in module includes a default implementation of the first plug-in interface, and a terminal software module does not include a service implementation of the first plug-in interface. It should be understood that the plug-in module may alternatively include a default implementation of another plug-in interface, and the terminal software module may alternatively include a service implementation of the another plug-in interface. This is not limited in this application.

In this example, the terminal software module includes a plug-in service factory, and the plug-in module includes a plug-in default factory. The plug-in default factory includes the first plug-in interface, the plug-in service factory inherits the first plug-in interface, and the terminal software module inherits the default implementation of the first plug-in interface.

In S201, an open-source software module generates a first instruction based on a user operation, where the first instruction is used to load the service implementation of the first plug-in interface.

In S210, the open-source software module sends the first instruction. Accordingly, a plug-in loading module receives the first instruction.

For specific descriptions of the foregoing two steps, refer to the related descriptions of S201 and S210 in the embodiments corresponding to FIG. 5 to FIG. 7. Details are not described herein.

In S224, the plug-in loading module sends, to the plug-in service factory based on the first instruction, a second instruction used to invoke the first plug-in interface.

The plug-in loading module may determine, based on the first instruction, that the open-source software module wants to invoke the first plug-in interface to implement a plug-in function of the first plug-in interface. Therefore, the plug-in loading module may invoke the first plug-in interface by using the second instruction, to load the service implementation of the first plug-in interface and implement the plug-in function of the first plug-in interface.

Optionally, before sending the second instruction to the plug-in service implementation module, the plug-in loading module may send an instruction to a system, to determine whether the terminal software module is installed in the system. In this way, when the terminal software module is uninstalled, abnormal running of the open-source software module caused by the terminal software module being uninstalled can be effectively avoided through this step. For a specific description of this step, refer to the foregoing description of step S221. Details are not described again.

It should be noted that, if it is determined that the terminal software module is installed in the system, because the plug-in service factory inherits a plug-in interface of the plug-in default factory and the plug-in service implementation module inherits a default implementation of a plug-in default implementation module, the system that includes the plug-in service factory and the plug-in default factory does not need to determine whether the terminal software module includes the service implementation of the first plug-in interface, and does not need to send a feedback instruction when the terminal software module does not include the service implementation of the first plug-in interface. The system determines to load the default implementation or the service implementation of the first plug-in interface by using the plug-in service factory. No matter the plug-in service factory loads the default implementation or the service implementation of the first plug-in interface, it may be understood that the function of the first plug-in interface is implemented.

In S225, the plug-in service factory loads the default implementation of the first plug-in interface based on the second instruction.

The plug-in service implementation module does not include the service implementation of the first plug-in interface, but inherits the default implementation of the first plug-in interface in the plug-in default implementation module, and the plug-in service implementation module includes the default implementation of the first plug-in interface. Therefore, the plug-in service factory loads the default implementation of the first plug-in interface based on the second instruction.

Therefore, in the plug-in implementation method provided in this application, the terminal software module may inherit the default implementation of the first plug-in interface in the plug-in module by adding the plug-in service factory to the terminal software module and the plug-in default factory to the plug-in module by using a factory mode. In this way, when querying whether the service implementation of the first plug-in interface exists, the system may query only once and needs to query once whether the plug-in service factory exists. When the plug-in module invokes the plug-in interface for a plurality of times, a delay caused by querying can be reduced, and system performance is greatly improved.

It can be learned that, no matter whether the plug-in service implementation module includes a service implementation of a plug-in interface and whether the plug-in loading module loads the service implementation or a default implementation of the plug-in interface by using the plug-in service factory, it is considered that the plug-in loading module successfully invokes a function of the plug-in interface.

The following describes, by using version numbers of the open-source software module, the plug-in module, and the terminal software module, that the open-source software module can be decoupled from the terminal software module in the solution provided in this application, so that the open-source software module does not depend on the terminal software module.

In this application, when a plug-in interface is inconsistent with a plug-in function, this application is described by using a version number as an example.

Optionally, the version number of the terminal software module is a first version, the version number of the open-source software module is a second version, and the first version is different from the second version.

For example, the first version is version 2.0, and the second version is version 3.0.

Optionally, the method further includes: changing the terminal software module, where a version number of a changed terminal software module is a third version, and the third version is different from the first version.

For example, the changed terminal software module may be any one of the following cases: a quantity of service implementations of plug-in interfaces is increased; the quantity of service implementations of plug-in interfaces is decreased; and a service implementation of an original plug-in interface is upgraded to optimize the service implementation of the original plug-in interface. For example, a function of the service implementation of the original plug-in interface is to support standard definition (SD) video playing, and a function of a service implementation of a changed plug-in interface is to support high definition (HD) video playing.

For example, changing the terminal software module may be upgrading or rolling back the terminal software module, or may be uninstalling one terminal software module and then reinstalling another terminal software module by a user. This is not limited in this application, provided that the terminal software module is changed.

For example, a plug-in function and a plug-in interface of the unchanged terminal software module are inconsistent, and the version number of the terminal software module is inconsistent with that of the open-source software module. Based on this application, the change of the terminal software module does not affect the open-source software module. Therefore, only the terminal software module changes, and the open-source software module does not change. The version number of the changed terminal software module is the third version.

When the plug-in function of the terminal software module is consistent with the defined plug-in interface, the version number of the terminal software module is the same as the version number of the plug-in module. For example, the version number of the changed terminal software module and the version number of the plug-in module are both version 3.0.

For example, the version number of the plug-in module is the same as the version number of the open-source software module.

Based on this, when the plug-in function of the terminal software module is consistent with the defined plug-in interface, and the version number of the terminal software module is the same as the version number of the plug-in module, the version numbers of the open-source software module, the plug-in module, and the terminal software module are all the same.

As described above, for example, in some scenarios in FIG. 4, the terminal software module is uninstalled. In this case, the system includes the open-source software module 110 and the plug-in module 120. When the system does not include the terminal software module 130, the default implementation in the plug-in module 120 may be loaded, to implement a function requirement of open-source software for a plug-in interface. For example, the following describes a manner of loading the default implementation in the plug-in module 120 in a scenario of uninstalling the terminal software module.

Optionally, the method further includes: uninstalling the terminal software module; the open-source software module sends a sixth instruction to the plug-in loading module, where the sixth instruction is used to load the service implementation of the first plug-in interface; the plug-in loading module determines, based on the sixth instruction, that the terminal software module is not installed in the system; and the plug-in loading module loads the default implementation of the first plug-in interface.

That is, the plug-in loading module may determine, based on the sixth instruction that is sent by the open-source software module and used to load the service implementation of the first plug-in interface, whether a terminal software module is installed in the system. If no terminal software module is installed in the system, the plug-in loading module loads the default implementation of the first plug-in interface. If the terminal software module is installed in the system, the plug-in loading module sends an instruction used to invoke the first plug-in interface.

For example, the plug-in loading module may send an instruction to the system, and the system may determine, based on the instruction sent by the plug-in loading module, whether a terminal software module is installed in the system. If no terminal software module is installed in the system, the system sends a feedback instruction to the plug-in loading module to indicate that no terminal software module is installed in the system. If the terminal software module is installed in the system, the plug-in loading module sends, to the plug-in service implementation module without receiving a feedback instruction sent by the system, the instruction used to invoke the first plug-in interface.

Therefore, in the plug-in implementation method provided in this application, the plug-in loading module determines, based on an instruction that is sent by the open-source software module and used to load a service implementation of a plug-in interface, whether a terminal software module is installed in the system. This effectively avoids abnormal running of the open-source software module caused by uninstallation of the terminal software module. When it is determined that no terminal software module is installed in the system, the plug-in loading module loads a default implementation of the plug-in interface, so that the open-source software module can run normally, to implement normal running of an electronic device. In this way, the open-source software module no longer depends on the terminal software module.

In the foregoing embodiment, the plug-in loading module may determine, by using the provided plug-in loading module and the plug-in default implementation module of the plug-in module, whether a service implementation of a plug-in interface exists in the terminal software module. If the service implementation of the plug-in interface exists in the terminal software module, the plug-in loading module loads the service implementation of the plug-in interface. If the service implementation of the plug-in interface does not exist in the terminal software module, the plug-in loading module loads a default implementation of the plug-in interface. In this way, a plug-in may be extended to extend a service function of a terminal. In addition, when the plug-in interface is inconsistent with the plug-in function, the default implementation or the service implementation of the plug-in interface may be implemented by using the plug-in module. This implements normal running of the open-source software, and implements normal running of the electronic device. In this way, the open-source software module no longer depends on the terminal software module.

Conversely, because the terminal software module is deeply developed and customized based on the open-source software module, if code of the open-source software module changes, code of the terminal software module also needs to change. For example, if a version of the open-source software module is upgraded, a version of the terminal software module also needs to be upgraded. If the version of the open-source software module is rolled back, the version of the terminal software module also needs to be rolled back. That is, the terminal software module depends on the open-source software module.

Based on this, it is proposed in this application that, an adaptation module serves as a bridge between the open-source software module and the terminal software module, to shield the change of the open-source software module. Therefore, when the open-source software module changes, the terminal software module does not change, so that the terminal software module does not depend on the open-source software module.

Because interaction between the open-source software module and the terminal software module is involved, the adaptation module that serves as the bridge between the open-source software module and the terminal software module needs to match functions related to a plug-in function of terminal software in the open-source software module during software design. For ease of description, a function that is in the open-source software module and related to the plug-in function of the terminal software is denoted as a related function, and the related function does not change. The terminal software module learns only that the open-source software module provides the related functions, and the terminal software module is unaware of whether code for implementing the related functions changes. In this way, the adaptation module shields the change of the open-source software module to the terminal software module. In addition, if the related function in the open-source software module changes, related functions of a plurality of versions may be compatible in the adaptation module. An image update function is used as an example. Version 1 corresponds to a function 1, and version 2 corresponds to a function 2. The adaptation module may load a service implementation (or a function module) of the open-source software module based on a current version of the open-source software module.

For example, when the open-source software module is an Android™ software module, the adaptation module may also be referred to as an Android™ open-source project (AOSP) adaptation module.

It should be understood that the adaptation module is configured for the terminal software module to load the service implementation in the open-source software module, and the plug-in loading module and the plug-in default implementation module in the foregoing embodiment are configured for the open-source software module to load a service implementation in the terminal software module, so that the open-source software module and terminal software module can load the service implementation of each other. It should be understood that when the user wants the system to implement some functions, but the open-source software module cannot implement the functions, the plug-in loading module and the plug-in default implementation module can be configured to load the service implementation of the terminal software module with cooperation of the terminal software module. If some functions are inherent in the open-source software module and do not need to be developed by the terminal software module, the service implementation of the open-source software module may be loaded by using the adaptation module.

Figure 10:
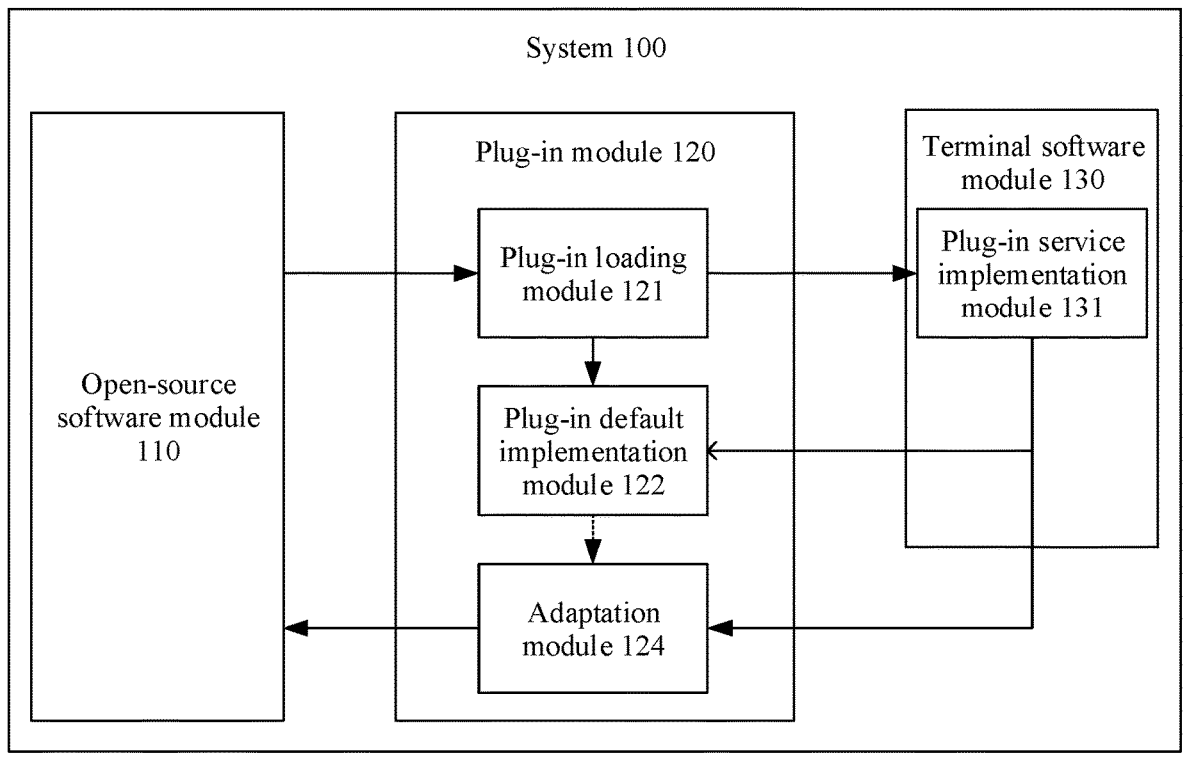
FIG. 10 to FIG. 12 are other schematic block diagrams of a plug-in implementation system according to this application.
Figure 11:
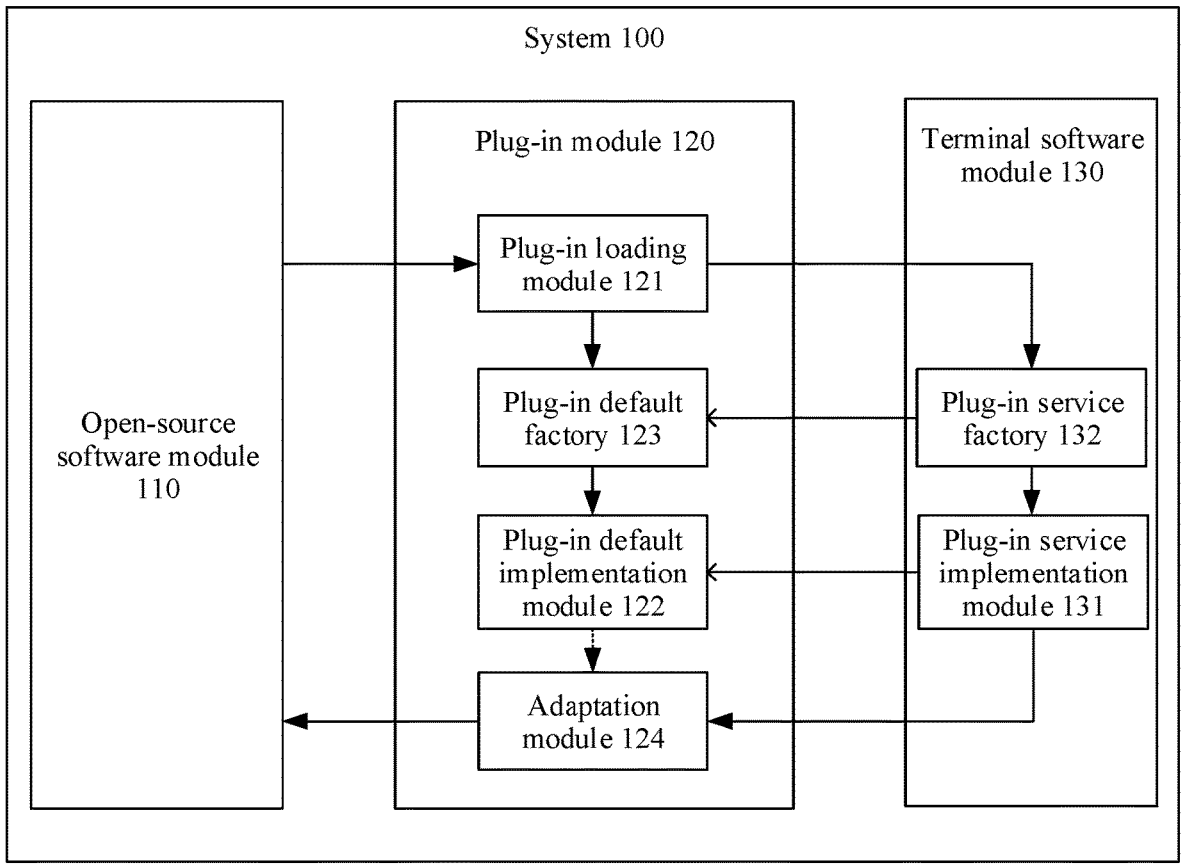

FIG. 10 and FIG. 11 are other schematic diagrams of a plug-in implementation system according to this application. FIG. 10 corresponds to FIG. 1, and an adaptation module is added to the system shown in FIG. 1. FIG. 11 corresponds to FIG. 8, and an adaptation module 124 is added to the system shown in FIG. 8. In FIG. 10 and FIG. 11, when the terminal software module 130 needs to load a service implementation of the open-source software module 110, the terminal software module 130 loads the service implementation of the open-source software module 110 by using the adaptation module 124. When a default implementation of a plug-in interface is an inherent service implementation of the open-source software module 110, the terminal software module 130 may load the service implementation of the open-source software module 110 by using the adaptation module 124.

Figure 12:
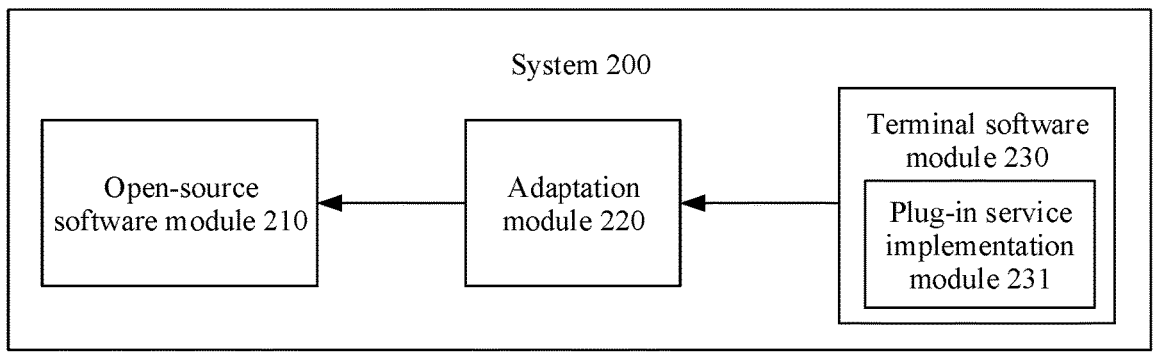

FIG. 12 is still another schematic diagram of a plug-in implementation system according to this application. A system 200 shown in FIG. 12 does not include a plug-in loading module and a default plug-in implementation module, and includes an open-source software module 210, an adaptation module 220, and a terminal software module 230. The terminal software module 230 includes a plug-in service implementation module that includes service implementations of a plurality of plug-in interfaces. When the terminal software module 230 needs to load a service implementation of the open-source software module 210, the terminal software module 230 loads the service implementation of the open-source software module 210 by using the adaptation module 220. It may be understood that, compared with the conventional technology, the adaptation module 220 is added to the system 200 shown in FIG. 12. When the open-source software module 210 changes, the terminal software module 230 does not change, so that the terminal software module 230 does not depend on the open-source software module 210.

The following describes a process in which the terminal software module loads the service implementation of the open-source software module by using the adaptation module. It should be understood that the terminal software module, the adaptation module, and the open-source software module in the following embodiment may be modules corresponding to FIG. 10 to FIG. 12.

Optionally, the method further includes: The terminal software module sends a third instruction to the adaptation module, where the third instruction is used to instruct loading of a first service implementation; and the adaptation module sends a fourth instruction to the open-source software module based on a current version of the open-source software module, where the fourth instruction is used to load a first service implementation in the open-source software module of the current version.

In this process, the plug-in service implementation module of the terminal software module may specifically send the fourth instruction to load the first service implementation in the open-source software module. After receiving the third instruction, the adaptation module may determine a version number of the open-source software module of the current version. After determining the version number of the open-source software module of the current version, the adaptation module instructs, by using the fourth instruction, to load the first service implementation in the open-source software module of the current version.

A 5G call is still used as an example in the following. With reference to the plug-in loading module and the adaptation module, a process in which the open-source software module and the terminal software module load a service implementation of each other is described.

1. A user enters a user operation by dialing a number and tapping a call button. The open-source software module generates a first instruction based on the user operation, and sends the first instruction. Optionally, the first instruction is a call instruction.

2. The plug-in loading module preferentially makes a call through a 5G network based on the call instruction, and sends a second command to the plug-in service implementation module to invoke a 5G call interface. The second command may be denoted as a 5G call command.

3. The plug-in loading module loads a service implementation of the 5G call interface based on the 5G call command, that is, implements the 5G call function.

4. In a process of implementing the 5G call function or in a process of loading the service implementation of the 5G call interface, a sound play function is used. Because the function is an inherent service implementation of the open-source software module, the sound play function in the open-source software module may be loaded. Based on this, the plug-in service implementation module may send the third instruction to the adaptation module, to instruct loading of the sound play function in the open-source software module. If the adaptation module determines that the current version of the open-source software module is version 3, the adaptation module sends the fourth instruction to the open-source software module based on the open-source software module of version 3.0, to instruct loading of the sound play function of the open-source software module of version 3.0.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Corresponding to the method provided in the foregoing method embodiments, an embodiment of this application further provides a corresponding electronic device. The electronic device includes a corresponding module configured to perform the foregoing embodiments. The module may be software, hardware, or a combination of software and hardware.

Figure 13:
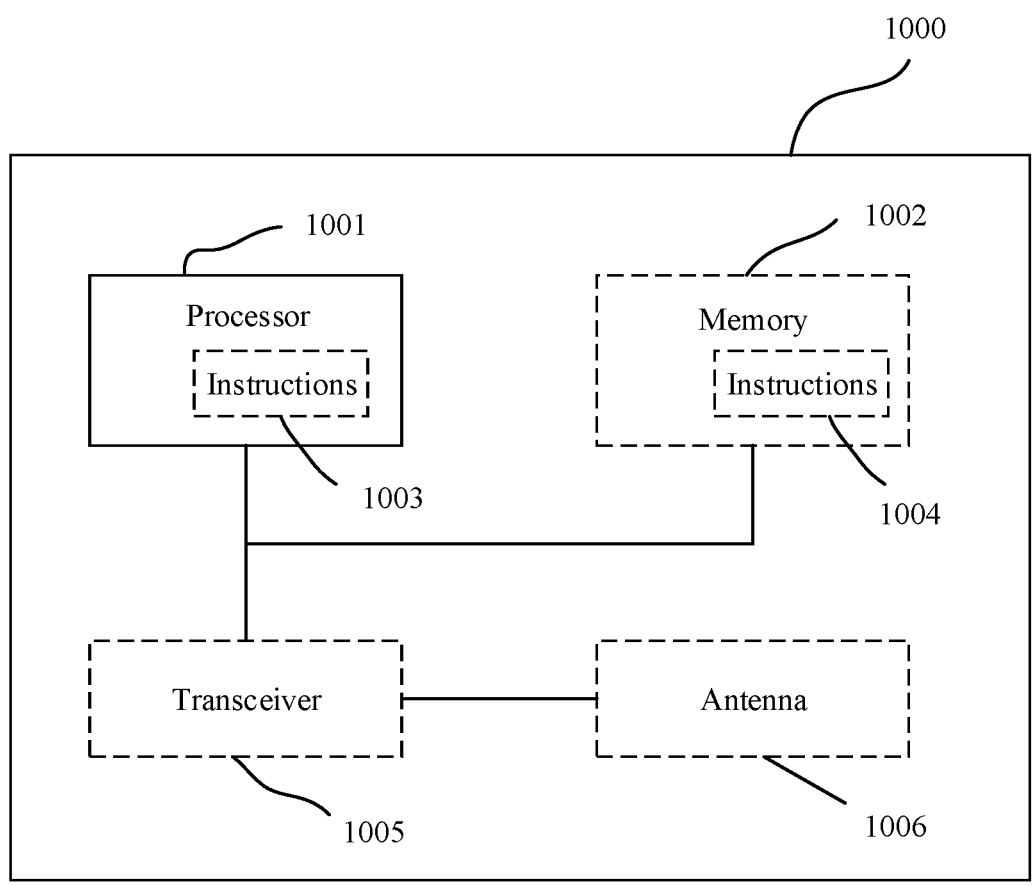
FIG. 13 and FIG. 14 are schematic diagrams of a structure of an electronic device according to this application.

FIG. 13 is a schematic diagram of a structure of an electronic device. An electronic device 1000 may be any possible electronic device including the systems provided in this application. In some embodiments, the electronic device may be a portable electronic device that further includes another function such as a personal digital assistant and/or a music player function, such as a mobile phone, a tablet computer, or a wearable electronic device (such as a smartwatch) having a wireless communications function. The portable electronic device may also be another portable electronic device, such as a laptop computer. It should be further understood that, in some other embodiments, the foregoing electronic device may not be the portable electronic device but a desktop computer.

The electronic device 1000 may include one or more processors 1001, and the processor 1001 may also be referred to as a processing unit, and can implement a specific control function. The processor 1001 may be a general-purpose processor, a dedicated processor, or the like. For example, the processor 1001 may be a baseband processor or a central processing unit. The baseband processor may be configured to process a communications protocol and communications data, and the central processing unit may be configured to control the electronic device, execute a software program, and process data of the software program.

In an optional design, the processor 1001 may also store instructions and/or data 1003, and the instructions and/or data 1003 may be run by the processor, so that the electronic device 1000 is enabled to perform the method described in the foregoing method embodiments.

In another optional design, the processor 1001 may include a transceiver unit configured to implement a sending function and a receiving function. For example, the transceiver unit may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, the electronic device 1000 may include a circuit. The circuit may implement the sending, receiving, or communications function in the foregoing method embodiments.

Optionally, the electronic device 1000 may include one or more memories 1002, and the memory 1002 may store instructions 1004, and the instructions may be run on the processor, so that the electronic device 1000 is enabled to perform the method described in the foregoing method embodiments. Optionally, the memory may further store data. Optionally, the processor may also store instructions and/or data. The processor and the memory may be separately disposed, or may be integrated together. For example, the correspondences described in the foregoing method embodiments may be stored in the memory or stored in the processor.

Optionally, the electronic device 1000 may further include a transceiver 1005 and/or an antenna 1006. The processor 1001 may be referred to as a processing unit, and controls the electronic device 1000. The transceiver 1005 may be referred to as a transceiver unit, a transceiver device, a transceiver circuit, a transceiver, or the like, and is configured to implement the sending and receiving functions.

The electronic device 1000 in this embodiment of this application may be configured to perform the methods described in FIG. 5, FIG. 6, FIG. 7, and FIG. 9 in the embodiments of this application, or may be configured to perform a method in which the methods described in the foregoing two or more figures are combined with each other.

In a possible design, an electronic device 1000 may include a processor 1001. The electronic device 1000 is configured to perform the procedures and steps corresponding to the modules in the foregoing method 200. For specific description, refer to the description of the foregoing embodiment. For brevity, details are not described herein again.

Figure 14:
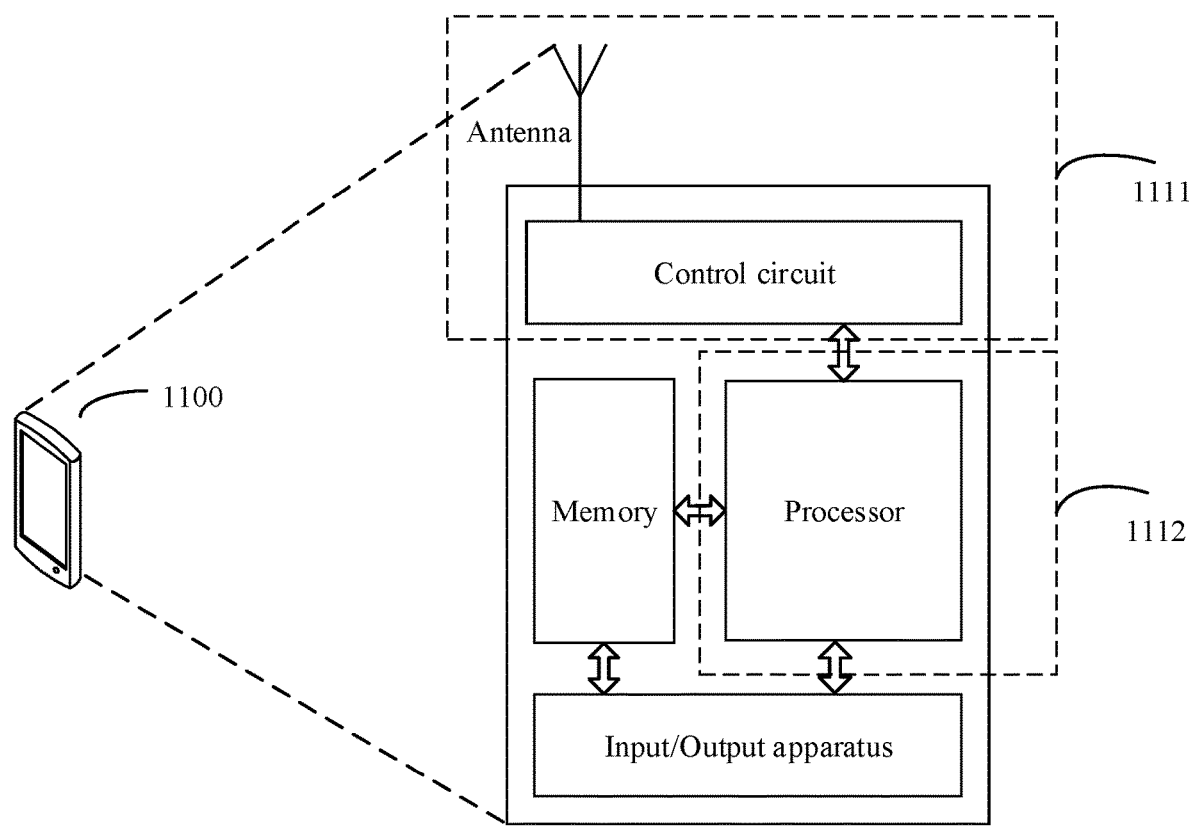

FIG. 14 is a schematic diagram of a structure of an electronic device. For ease of description, FIG. 14 shows only main components of the electronic device. As shown in FIG. 14, the electronic device 1100 includes a processor, a memory, a control circuit, an antenna, and an input/output apparatus. The processor is mainly configured to process a communications protocol and communications data, control an entire terminal, execute a software program, and process data of the software program. The memory is configured to store the software program and the data. A radio frequency circuit is mainly configured to perform conversion between a baseband signal and a radio frequency signal, and process a radio frequency signal. The antenna is mainly configured to receive and send a radio frequency signal in a form of an electromagnetic wave. The input/output apparatus, for example, a touchscreen, a display, or a keyboard, is mainly configured to receive data entered by a user, and output data to the user.

After the electronic device is powered on, the processor may read the software program in the storage unit, parse and execute instructions of the software program, and process the data of the software program. When data needs to be sent wirelessly, the processor performs baseband processing on the to-be-sent data, and outputs a baseband signal to the radio frequency circuit. The radio frequency circuit processes the baseband signal to obtain a radio frequency signal, and sends the radio frequency signal in an electromagnetic wave form through the antenna. When data is sent to the electronic device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 14 shows only one memory and one processor. In an actual electronic device, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communications protocol and the communications data. The central processing unit is mainly configured to control the entire electronic device, execute the software program, and process the data of the software program. The processor in FIG. 14 integrates functions of the baseband processor and the central processing unit. A person skilled in the art may understand that the baseband processor and the central processing unit may be processors independent of each other, and are interconnected by using technologies such as a bus. A person skilled in the art can understand that the electronic device may include a plurality of baseband processors to adapt to different network standards, the electronic device may include a plurality of central processing units to enhance a processing capability of the electronic device, and components of the electronic device may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of a software program. The processor executes the software program to implement a baseband processing function.

Figure 15:
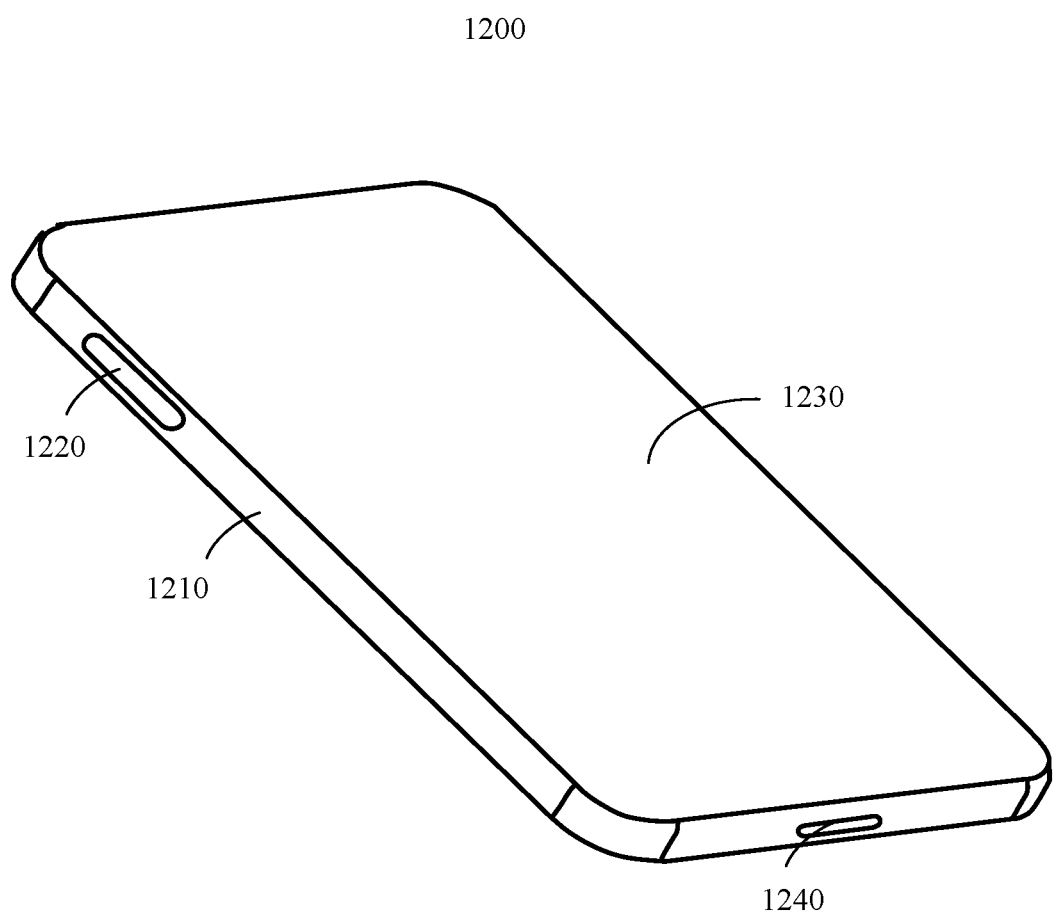
FIG. 15 is another example diagram of a structure of an electronic device according to this application.

FIG. 15 is another schematic diagram of a structure of an electronic device according to this application. As shown in FIG. 15, the electronic device includes a middle frame 1210, a function button 1220, a display 1230, an interface 1240, a processor, and a system provided in this application. For example, the system is stored in a memory. The function button 1220 and the interface 1240 are disposed on the middle frame 1210, and the display is disposed on one side of the middle frame 1210. For example, the electronic device 1200 may be a mobile phone.

It should be noted that, the terms "first" and "second" are merely intended for a purpose of descriptions, and shall not be understood as an indication or implication of relative importance or implicit indication of a quantity of indicated technical features. A feature limited by "first" or "second" may explicitly or implicitly include one or more features.

In the embodiments of this application, "at least one" means one or more, and "a plurality of" means two or more. "At least some elements" means some or all elements. The term "and/or" describes an association relationship between associated objects, and represents that three relationships may exist. For example, A and/or B may represent the following cases: Only A exists, both A and B exist, and only B exists, where A and B may be singular or plural. The character "/" generally represents an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A plug-in implementation system, comprising:
a memory storing a plug-in module and a terminal software module, the plug-in module comprises a default implementation of a first plug-in interface, the terminal software module does not comprise a service implementation of the first plug-in interface; and
a processor coupled with the memory to execute the plug-in module and the terminal software module, and the plug-in module configures the processor to:
obtain a first instruction, wherein the first instruction is used to load the service implementation of the first plug-in interface, and
load the default implementation of the first plug-in interface based on the first instruction.

2. The system according to claim 1, wherein the plug-in module further configures the processor to:
send, to the terminal software module based on the first instruction, a second instruction used to invoke the first plug-in interface; and
load the default implementation of the first plug-in interface based on a first feedback instruction that is fed back by the system for the second instruction, wherein the first feedback instruction indicates that the terminal software module does not comprise the service implementation of the first plug-in interface.

3. The system according to claim 1, wherein the terminal software module comprises a plug-in service factory, the plug-in module comprises a plug-in default factory, the plug-in default factory comprises the first plug-in interface, the plug-in service factory inherits the first plug-in interface, and the terminal software module inherits the default implementation of the first plug-in interface; and
the plug-in module configures the processor to send, to the terminal software module based on the first instruction, a second instruction used to invoke the first plug-in interface; and
the terminal software module configures the processor to load the default implementation of the first plug-in interface based on the second instruction.

4. The system according to claim 1, wherein the memory of the system further stores an open-source software module, and the plug-in module further configures the processor to:
receive a third instruction sent by the terminal software module, wherein the third instruction is used to load a first service implementation; and
send a fourth instruction to the open-source software module based on a current version of the open-source software module, wherein the fourth instruction is used to cause the processor to load the first service implementation in the open-source software module of the current version.

5. The system according to claim 1, wherein a version number of the terminal software module is a first version, a version number of the open-source software module is a second version, and the first version is different from the second version.

6. The system according to claim 5, wherein the memory of the system further comprises an open-source software module that configures the processor to:
change the terminal software module, wherein a version number of a changed terminal software module is a third version, and the third version is different from the first version.

7. The system according to claim 1, wherein the terminal software module comprises a service implementation of a second plug-in interface, and the plug-in module configures the processor to:
obtain a fifth instruction, wherein the fifth instruction loads the service implementation of the second plug-in interface; and
invoke the second plug-in interface based on the fifth instruction to cause the processor to load the service implementation of the second plug-in interface.

8. The system according to claim 1, wherein the memory of the system further stores an open-source software module that causes the processor to uninstall the terminal software module; and
the plug-in module causes the processor to:
obtain a sixth instruction, wherein the sixth instruction loads the service implementation of the first plug-in interface,
determine, based on the sixth instruction, that the terminal software module is not installed in the system, and
load the default implementation of the first plug-in interface.

9. The system according to claim 1, wherein the plug-in module comprises a plug-in loading module and a plug-in default implementation module, and the plug-in default implementation module comprises the default implementation of the first plug-in interface; and
the plug-in loading module causes the processor to:
obtain a first instruction, where the first instruction is used to load the service implementation of the first plug-in interface, and
load the default implementation of the first plug-in interface in the plug-in default implementation module based on the first instruction.

10. The method according to claim 1, wherein the first plug-in interface is any one of the following: a dual-card management interface, a full-frequency interface, a hot plug interface, a SkyTone interface, and a fifth generation (5G) call interface.

11. A plug-in implementation method, comprising:
obtaining, by a system executing a plug-in module, a first instruction, wherein the first instruction loads a service implementation of a first plug-in interface, wherein the system comprises a memory that stores the plug-in module and a terminal software module, wherein the plug-in module comprises a default implementation of a first plug-in interface, the terminal software module does not comprise a service implementation of the first plug-in interface; and
loading, by the system executing the plug-in module, the default implementation of the first plug-in interface based on the first instruction.

12. The method according to claim 11, wherein the loading, by the system executing the plug-in module, the default implementation of the first plug-in interface based on the first instruction comprises:
sending, by the plug-in module to the terminal software module based on the first instruction, a second instruction used to invoke the first plug-in interface; and
loading, by the plug-in module, the default implementation of the first plug-in interface based on a first feedback instruction that is fed back by the system for the second instruction, wherein the first feedback instruction indicates that the terminal software module does not comprise the service implementation of the first plug-in interface.

13. The method according to claim 11, wherein the terminal software module comprises a plug-in service factory, the plug-in module comprises a plug-in default factory, the plug-in default factory comprises the first plug-in interface, the plug-in service factory inherits the first plug-in interface, and the terminal software module inherits the default implementation of the first plug-in interface; and
the loading, by the plug-in module, the default implementation of the first plug-in interface based on the first instruction comprises:
sending, by the plug-in module to the terminal software module based on the first instruction, a second instruction used to invoke the first plug-in interface; and
loading, by the terminal software module, the default implementation of the first plug-in interface based on the second instruction.

14. The method according to claim 11, wherein the memory of the system further comprises an open-source software module, and the method further comprises:
receiving, by the plug-in module, a third instruction sent by the terminal software module, wherein the third instruction is used to load a first service implementation; and
sending, by the plug-in module, a fourth instruction to the open-source software module based on a current version of the open-source software module, wherein the fourth instruction loads the first service implementation in the open-source software module of the current version.

15. The method according to claim 11, wherein a version number of the terminal software module is a first version, a version number of the open-source software module is a second version, and the first version is different from the second version.

16. The method according to claim 15, wherein the method further comprises:
changing the terminal software module, wherein a version number of a changed terminal software module is a third version, and the third version is different from the first version.

17. The method according to claim 11, wherein the terminal software module comprises a service implementation of a second plug-in interface, and the method comprises:
obtaining, by the plug-in module, a fifth instruction, wherein the fifth instruction loads the service implementation of the second plug-in interface; and
invoking, by the plug-in module, the second plug-in interface based on the fifth instruction, to load the service implementation of the second plug-in interface.

18. The method according to claim 11, wherein the method further comprises:
uninstalling the terminal software module;
obtaining, by the plug-in module, a sixth instruction, wherein the sixth instruction is used to load the service implementation of the first plug-in interface;
determining, by the plug-in module based on the sixth instruction, that the terminal software module is not installed in the system; and
loading, by the plug-in module, the default implementation of the first plug-in interface.

19. The method according to claim 11, wherein the first plug-in interface is any one of the following: a dual-card management interface, a full-frequency interface, a hot plug interface, a SkyTone interface, and a fifth generation (5G) call interface.

20. An electronic device, comprising:
a display; and
a system that comprises a processor and a memory, the memory storing a plug-in module and a terminal software module, the plug-in module comprises a default implementation of a first plug-in interface, the terminal software module does not comprise a service implementation of the first plug-in interface, and the plug-in module configures the processor to:
obtain a first instruction, wherein the first instruction loads the service implementation of the first plug-in interface, and
load the default implementation of the first plug-in interface based on the first instruction.

* * * * *